(12) United States Patent
Donaldson

(10) Patent No.: US 6,321,267 B1
(45) Date of Patent: Nov. 20, 2001

(54) METHOD AND APPARATUS FOR FILTERING JUNK EMAIL

(75) Inventor: Albert L. Donaldson, Oakton, VA (US)

(73) Assignee: ESCOM Corporation, Oakton, VA (US)

( * ) Notice: Subject to any disclaimer, the term of this patent is extended or adjusted under 35 U.S.C. 154(b) by 0 days.

(21) Appl. No.: 09/447,590

(22) Filed: Nov. 23, 1999

(51) Int. Cl.$^7$ .................................................. G06F 15/16
(52) U.S. Cl. ..................... 709/229; 709/218; 709/227; 709/238; 370/351; 713/201
(58) Field of Search ...................................... 709/229, 217, 709/218, 219, 232, 249, 206, 204, 227, 238; 370/351, 241, 392; 707/10; 713/200, 201; 379/219

(56) References Cited

U.S. PATENT DOCUMENTS

| | | |
|---|---|---|
| 5,283,856 | 2/1994 | Gross et al. . |
| 5,619,648 * | 4/1997 | Canale et al. ........................ 707/200 |
| 5,623,600 | 4/1997 | Ji et al. . |
| 5,677,955 * | 10/1997 | Doggett et al. ....................... 380/24 |
| 5,742,769 | 4/1998 | Lee et al. . |
| 5,826,022 | 10/1998 | Nielsen . |
| 5,826,269 | 10/1998 | Hussey . |
| 5,832,208 | 11/1998 | Chen et al. . |
| 5,905,863 | 5/1999 | Knowles et al. . |
| 5,930,471 | 7/1999 | Milewski et al. . |
| 5,937,161 | 8/1999 | Mulligan et al. . |
| 5,999,932 * | 12/1999 | Paul ....................................... 707/10 |
| 6,023,723 * | 2/2000 | McCormick et al. ............... 709/206 |
| 6,075,863 * | 6/2000 | Krishnan et al. ...................... 380/49 |

OTHER PUBLICATIONS

Robert Harker, Selectively Rejecting SPAM Using Sendmail, Proceedings of the Eleventh Systems Administration Conference (LISA '97), San Diego, California, Oct. 1997, pp. 205–220.

Jonathan B. Postel, Simple Mail Transfer Protocol, Aug. 1982, pp. 1–68.

David H. Croker, Standard for the Format of ARPA Internet Text Messages, Aug. 13, 1982, pp. 1–47.

Cauce, Coalition Against Unsolicited Commercial Email, www.cauce.org, 2 pages.

Spam Recycling Center, www.chooseyourmail.com/spamfilters2.cfm, 1 page.

Spam–Free Email Account Services, www.mailcircuit.com/hand.htm, 1 page.

Mail Essentials, www.gficomms.com/pages/spamrecycle.htm, Copyright 2000, 2 pages.

Brightmail, Corporate Solutions Overview, www.brightmail.com/corporate/overview, 2 pages.

Praetor Messaging Firewall, Advanced Anti–Spam/Messaging Firewall for Microsoft Exchange, website, www.cmsconnect.com/Praetor/prMain.htm, Copyright 2000, 3 pages.

(List continued on next page.)

Primary Examiner—Ario Etienne
(74) Attorney, Agent, or Firm—Blank Rome Comisky & McCauley LLP

(57) ABSTRACT

An Active Filtering proxy filters electronic junk mail (also known as spam, bulk mail, or advertising) received at a Message Transfer Agent from remote Internet hosts using the Simple Mail Transfer Protocol (SMTP). The proxy actively probes remote hosts that attempt to send mail to the protected mail server in order to identify dialup PCs, open relays, and forged email. The system provides multiple layers of defense including: connect-time filtering based on IP address, identification of dialup PCs attempting to send mail, testing for permissive (open) relays, testing for validity of the sender's address, and message header filtering. A sender's message must successfully pass through all relevant layers, or it is rejected and logged. Subsequent filters feed IP addresses back to the IP filtering mechanism, so subsequent mail from the same host can be easily blocked.

68 Claims, 21 Drawing Sheets

BLOCK DIAGRAM OF ACTIVE FILTERING SYSTEM

OTHER PUBLICATIONS

Praetor Messaging Firewall for Exchange Whitepaper, revised Jun. 1, 1999, pp. 1–10.

MAPS TSI: Anti–Relay: What is Third–Party Mail Relay, mai–labuse.org/tsi/ar–what.html, revised Jul. 31, 1999, 3 pages.

MAPS Realtime Blackhole List, mail–abuse.org/rbl/, revised Feb. 28, 2000, 1 page.

MAPS RBL Rationale, mail–abuse.org/rbl/rationale.html, revised Jul. 12, 1999 5 pages.

MAPS Dial–up User List, mail–abuse.org/dul/, revised Mar. 13, 2000, 10 pages.

BYTE, www.byte.com, Apr. 5, 1999, 16 pages.

* cited by examiner

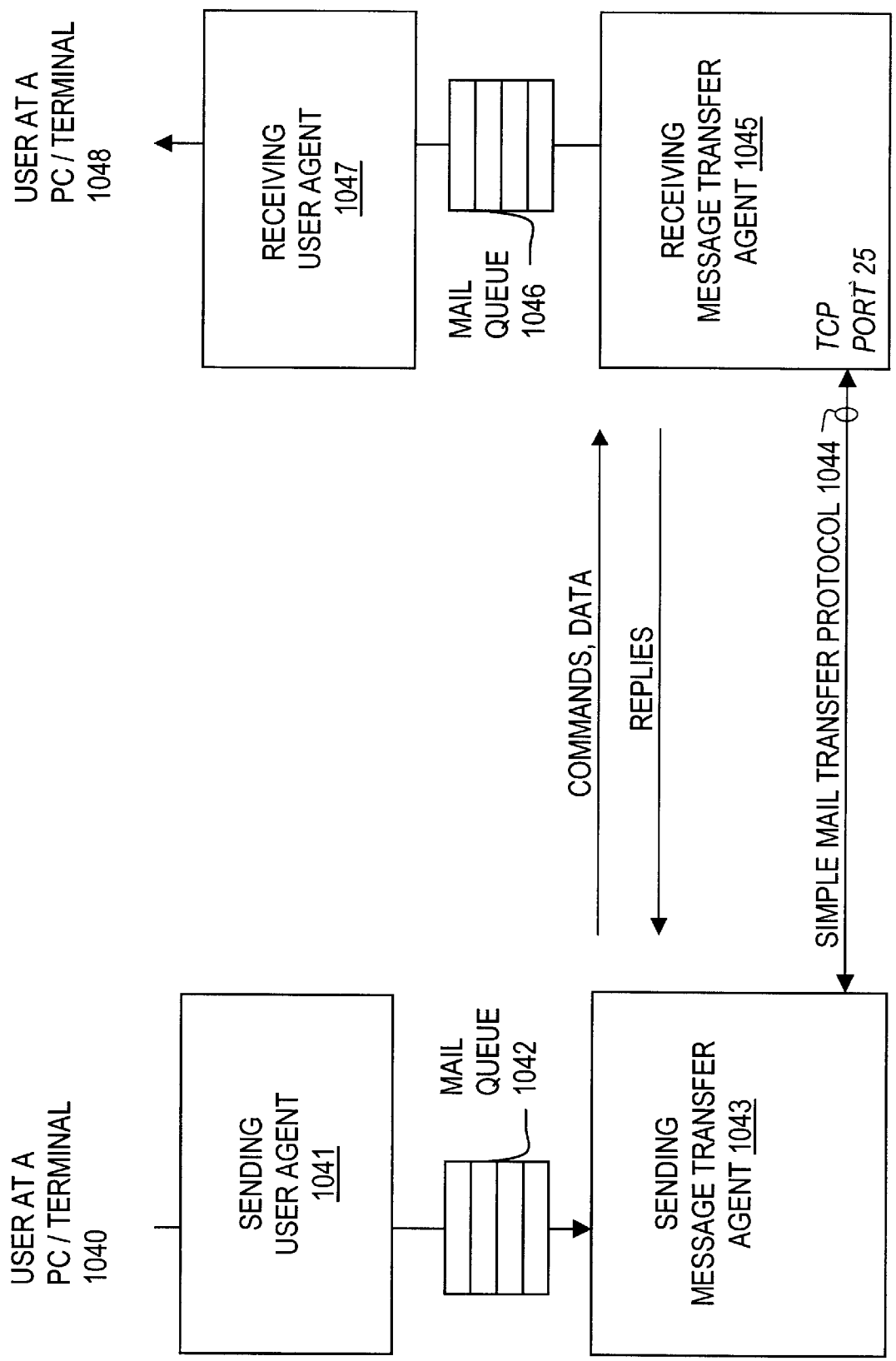
FIGURE 1. PRIOR ART - SMTP ARCHITECTURE

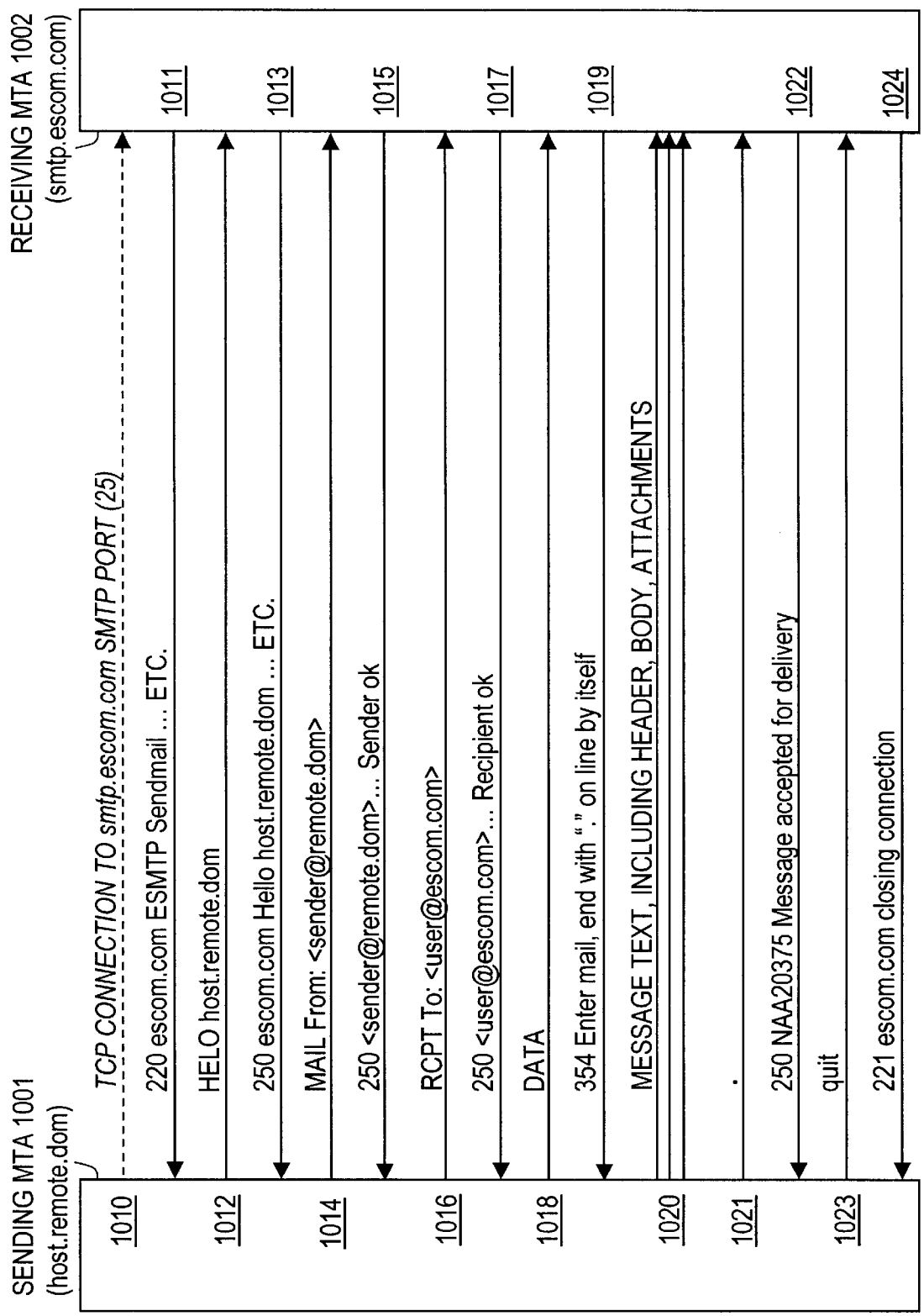
FIGURE 2. PRIOR ART - EXAMPLE OF SMTP MESSAGE TRANSFER

```
< 220 escom.com ESMTP Sendmail 8.9.3/8.9.3; Mon, 6 Sep 1999 21:12:35 -0400 (EDT)  ⎫
> HELO host.remote.dom                                                             ⎬ STARTING PROTOCOL
< 250 escom.com Hello host.remote.dom [192.168.255.255], pleased to meet you       
> MAIL From: <sender@remote.dom>
< 250 <sender@remote.dom>... Sender ok
> RCPT To: <user@escom.com>
< 250 <user@escom.com>... Recipient ok
> DATA
< 354 Enter mail, end with "." on a line by itself                                 ⎭
> Received: from remote.dom (host.remote.dom [192.168.255.255])                    ⎫
>     by smtp.escom.com (8.9.3/8.9.3) with ESMTP id NAA20375
>     for <user@escom.com>; Mon, 6 Sep 1999 21:12:39 -0400 (EDT)
> Received: (from sender@localhost)                                                
>     by remote.dom (8.9.3/8.9.3) id NAA20375                                      ⎬ HEADER
>     for user@escom.com; Mon, 6 Sep 1999 21:11:29 -0400 (EDT)
> Date: Mon, 6 Sep 1999 21:11:29 -0400 (EDT)
> From: <sender@remote.dom>
> Message-Id: <19990907011.NAA20375@remote.dom>
> To: user@escom.com
> Subject: example message                                                         ⎭
>                                                                                  ⎫
> This is an example of SMTP message exchange.                                     ⎬ BODY
>                                                                                  ⎭
> .
< 250 NAA20375 Message accepted for delivery                                       ⎫
> quit                                                                             ⎬ ENDING PROTOCOL
< 221 escom.com closing connection                                                 ⎭
```

FIGURE 3. PRIOR ART - DETAILED EXAMPLE OF SMTP MESSAGE TRANSFER

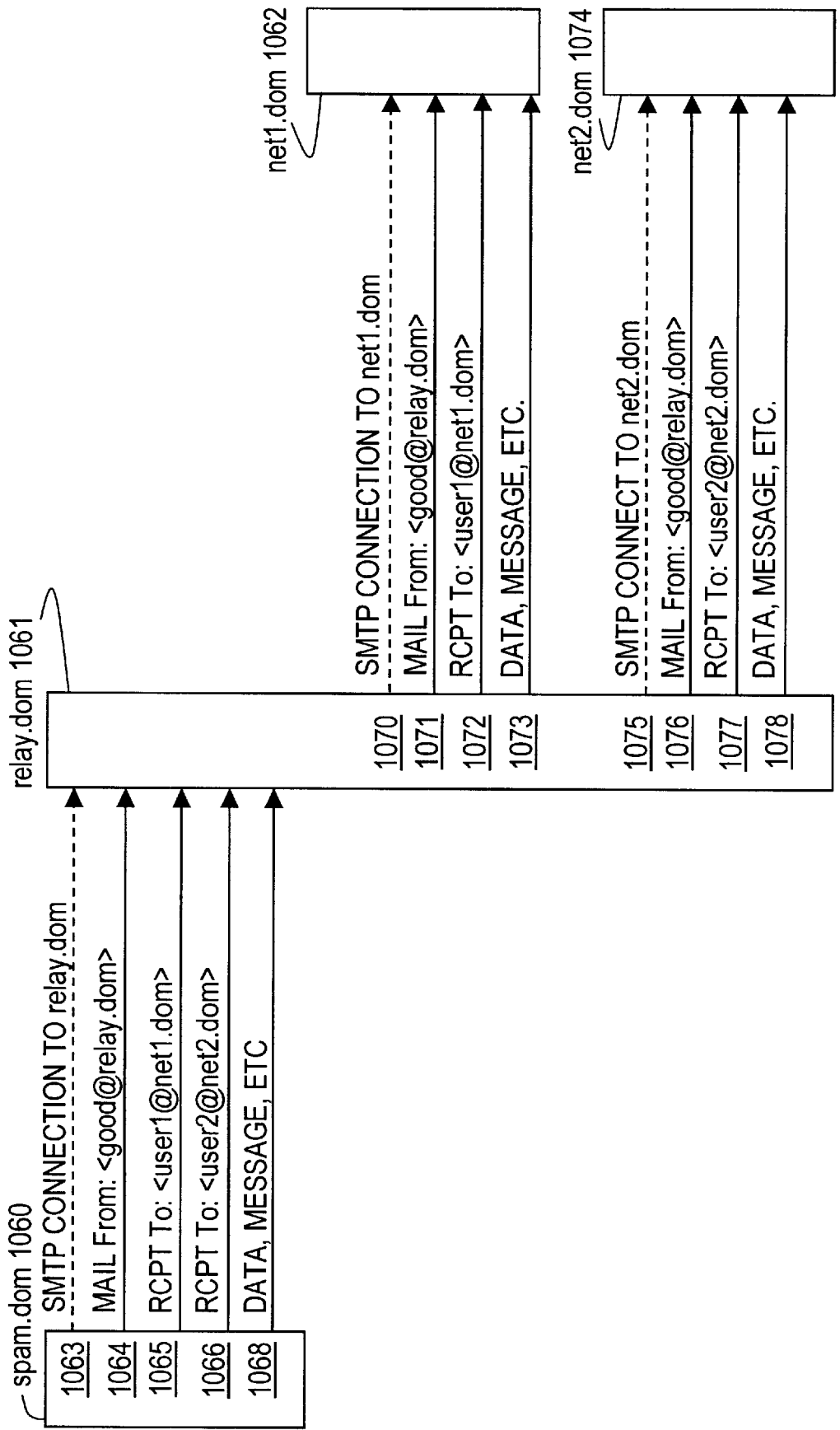
FIGURE 4. PRIOR ART - EXAMPLE OF RELAY ABUSE.

```
< 220 anubis.itesm.dom Sendmail SMI-8.6/SMI-SVR4 ready [...]
> HELO local.dom
< 250 anubis.itesm.dom Hello local.dom [...]
> MAIL From: <relay_test@local.dom>
< 250 <relay_test@local.dom>... Address ok
> RCPT To: <nobody@local.dom>
< 250 <nobody@local.dom>... Recipient ok
```

FIGURE 5. PRIOR ART - SMTP TRANSACTIONS FOR RELAY TEST

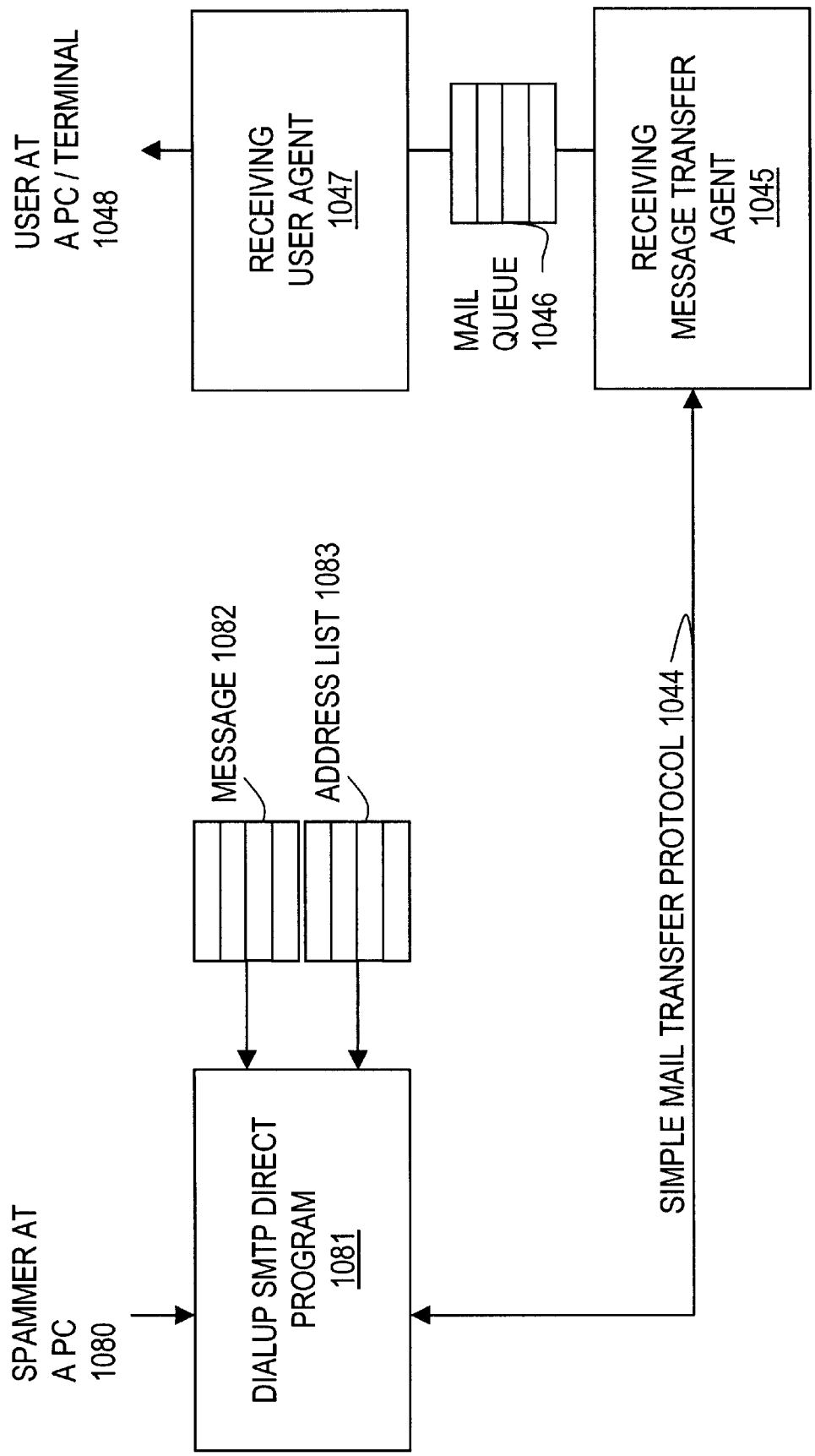
FIGURE 6. PRIOR ART - DIALUP SMTP ARCHITECTURE

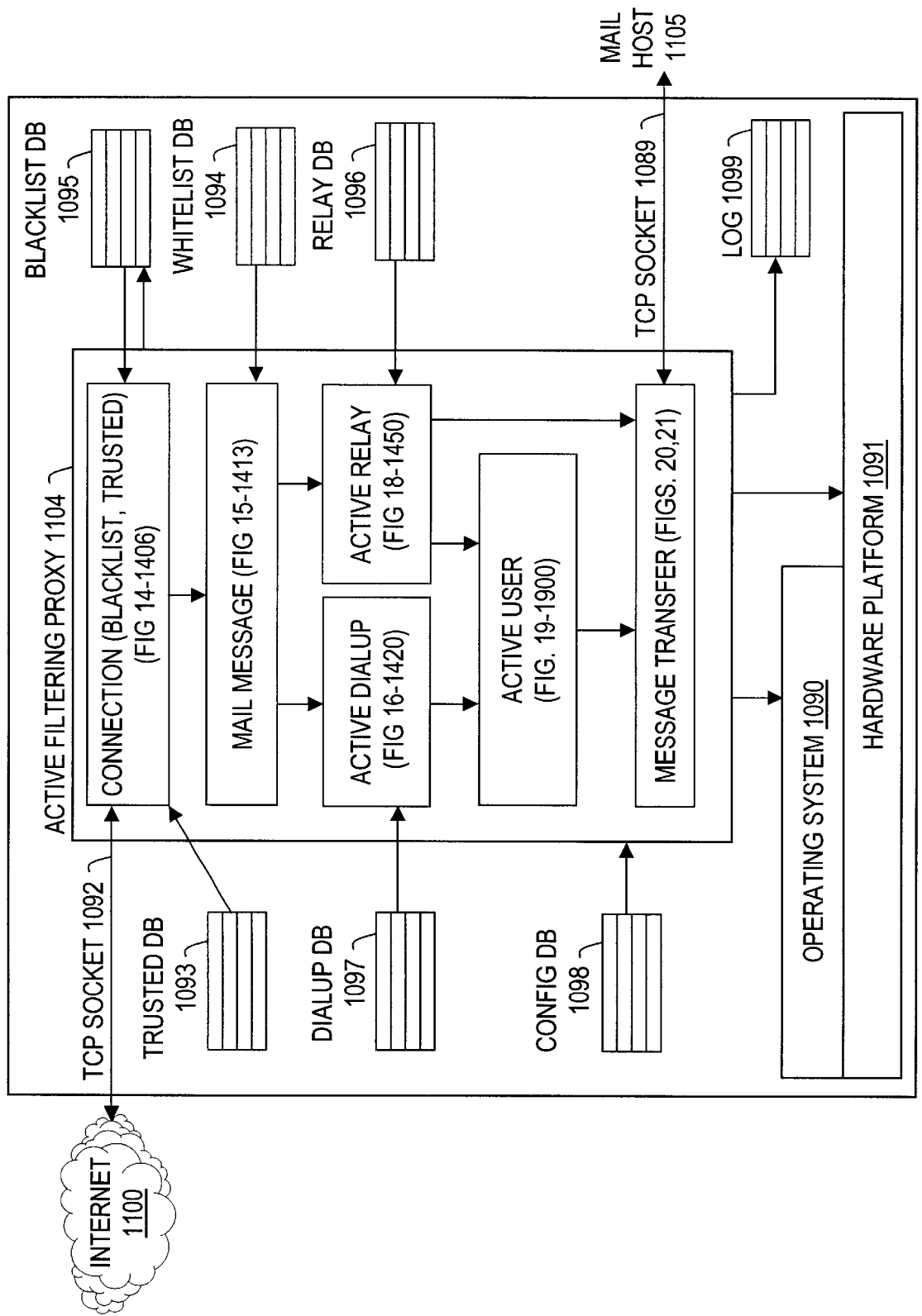
FIGURE 7. BLOCK DIAGRAM OF ACTIVE FILTERING SYSTEM

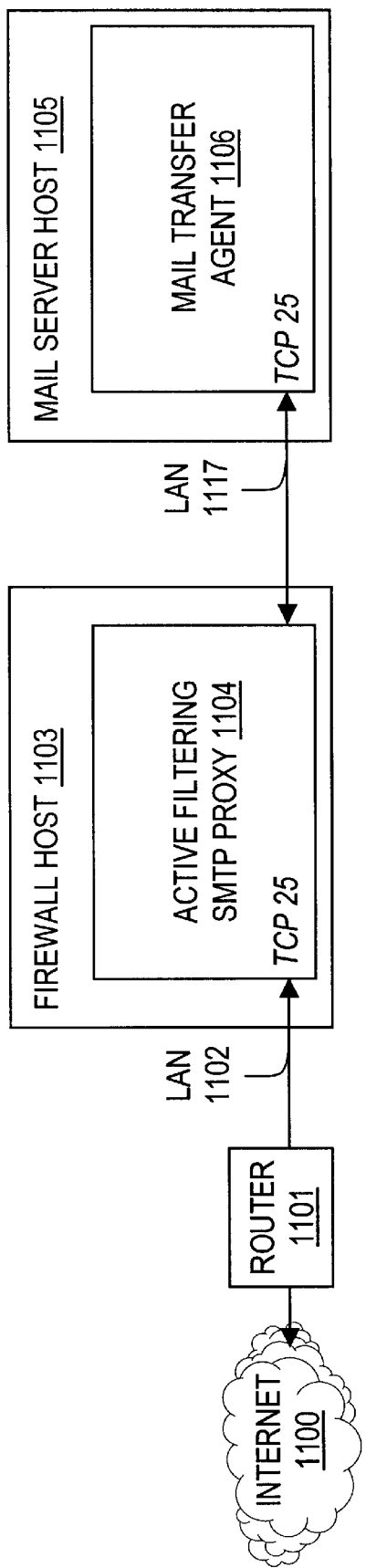
FIGURE 8. ACTIVE FILTERING PROXY IN CONVENTIONAL FIREWALL CONFIGURATION.
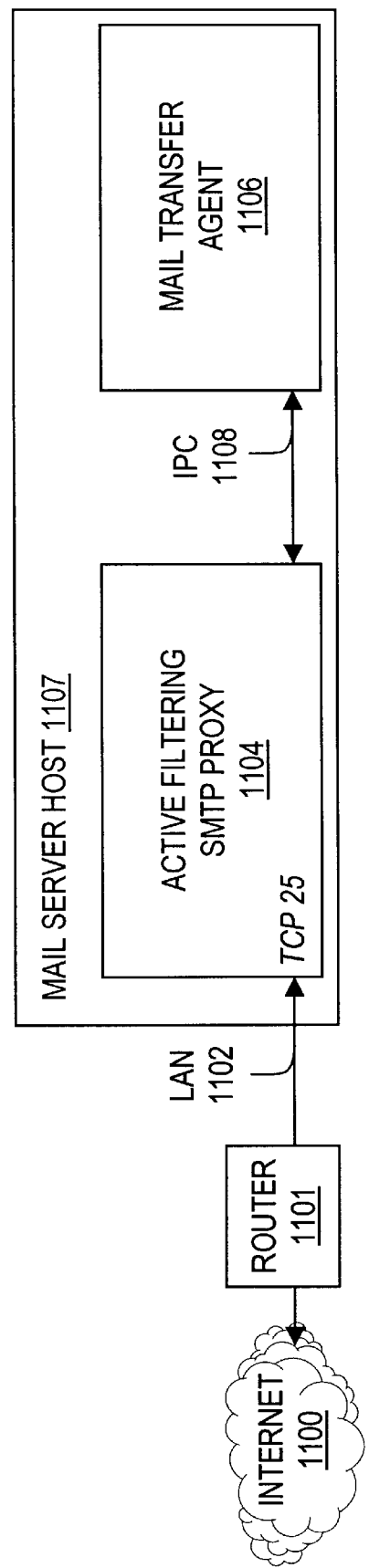
FIGURE 9. SINGLE-HOST ARCHITECTURE

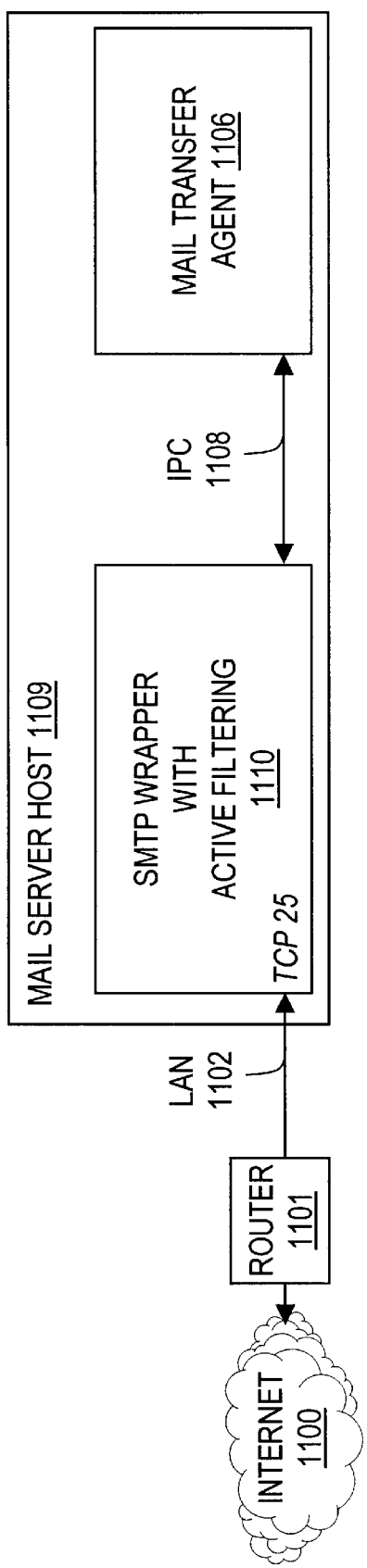
FIGURE 10. ACTIVE FILTERING IMPLEMENTED AS PART OF SMTP WRAPPER
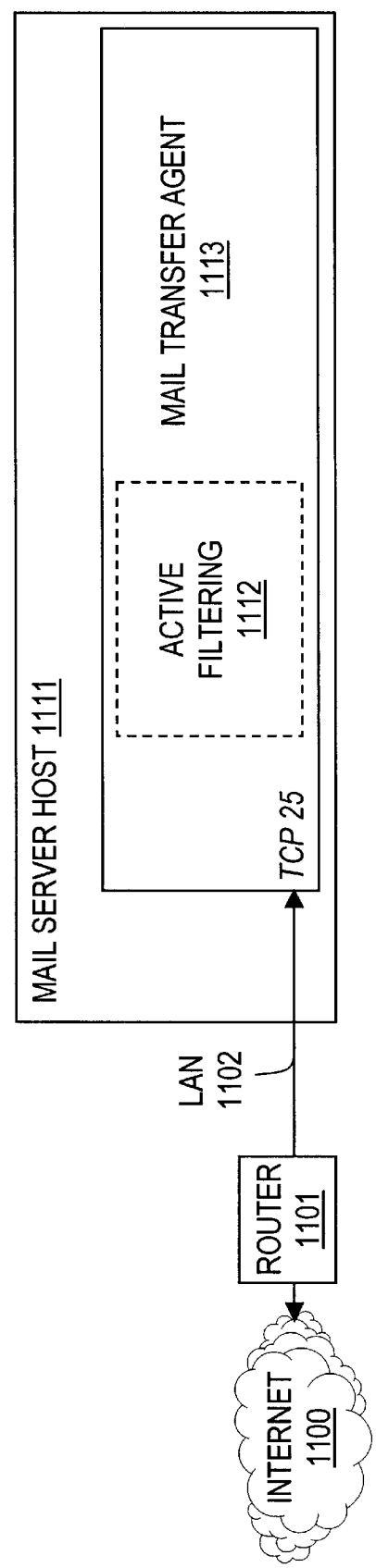
FIGURE 11. ACTIVE FILTERING IMPLEMENTED AS PART OF MAIL TRANSFER AGENT

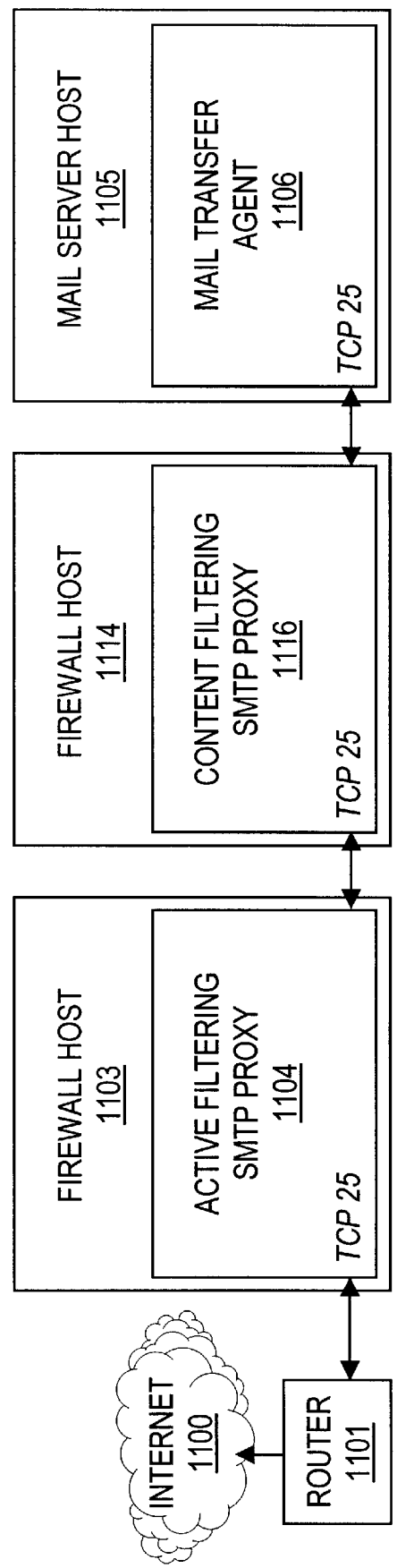
FIGURE 12. ACTIVE FILTERING PROXY CHAINED WITH CONTENT FILTERING PROXY

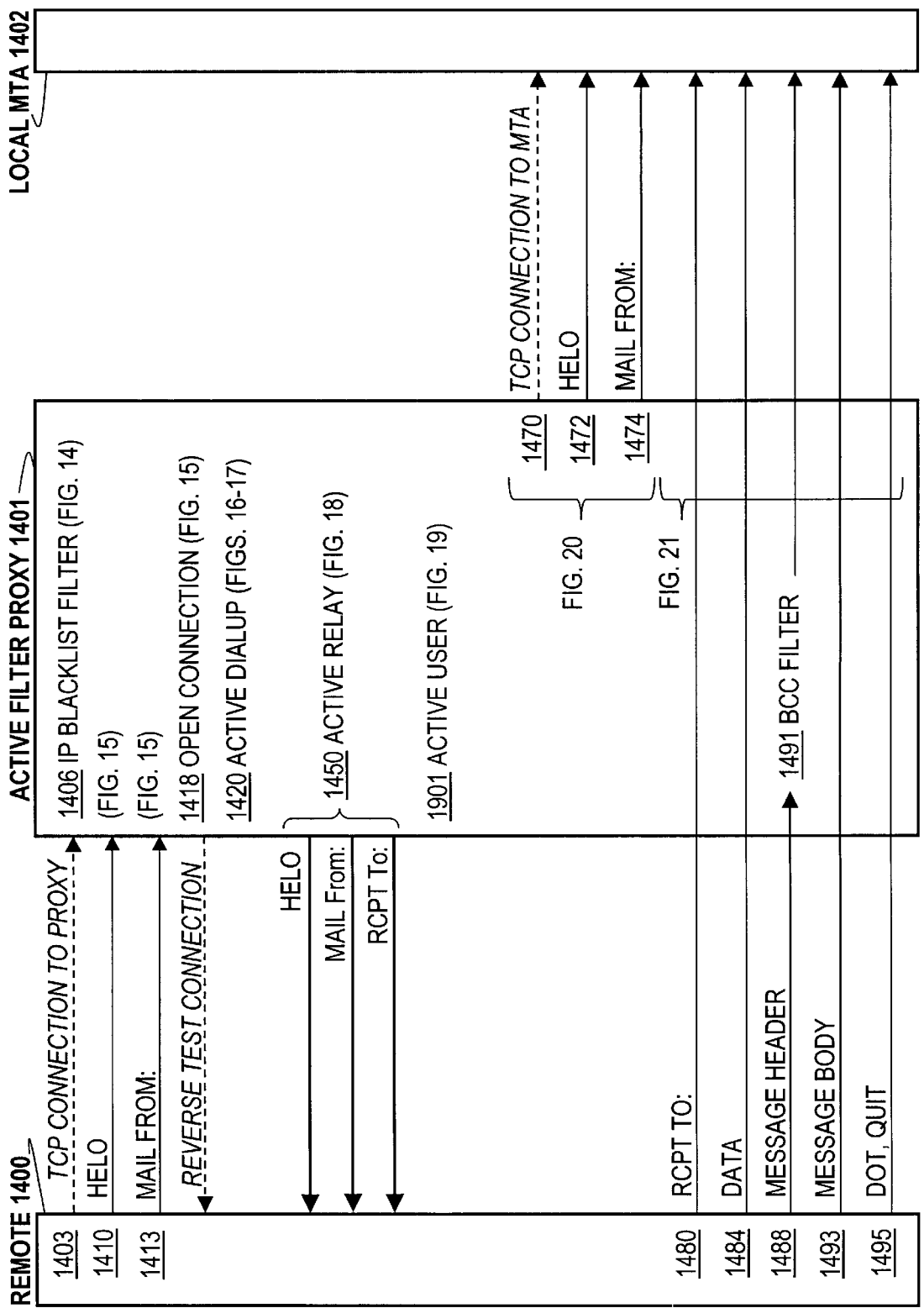
FIGURE 13. ACTIVE FILTERING OVERVIEW (NOT SHOWING STATUS RESPONSES)

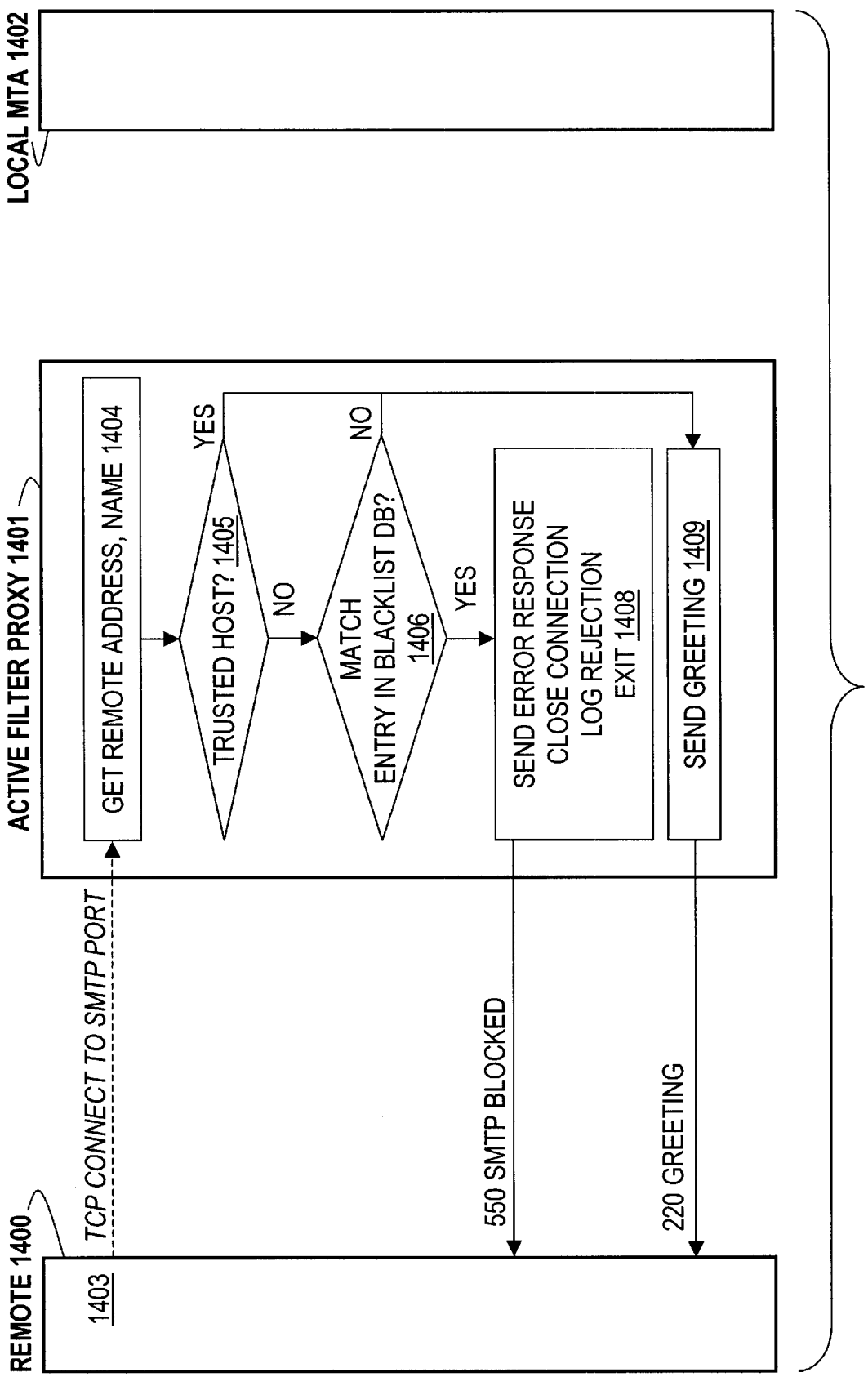
FIGURE 14. IP BLACKLIST FILTERING

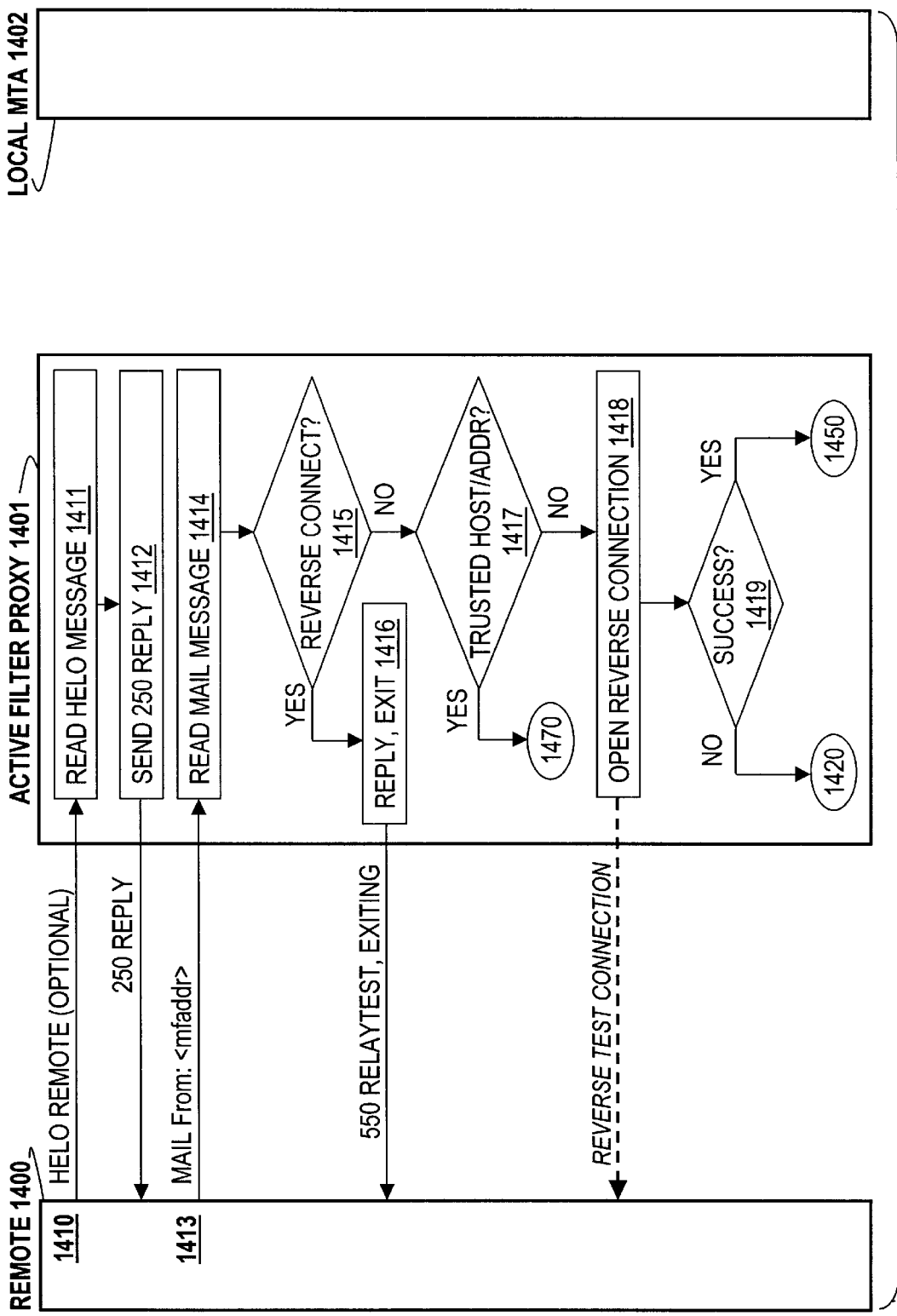
FIGURE 15. REMOTE HELO AND MAIL MESSAGE PROCESSING

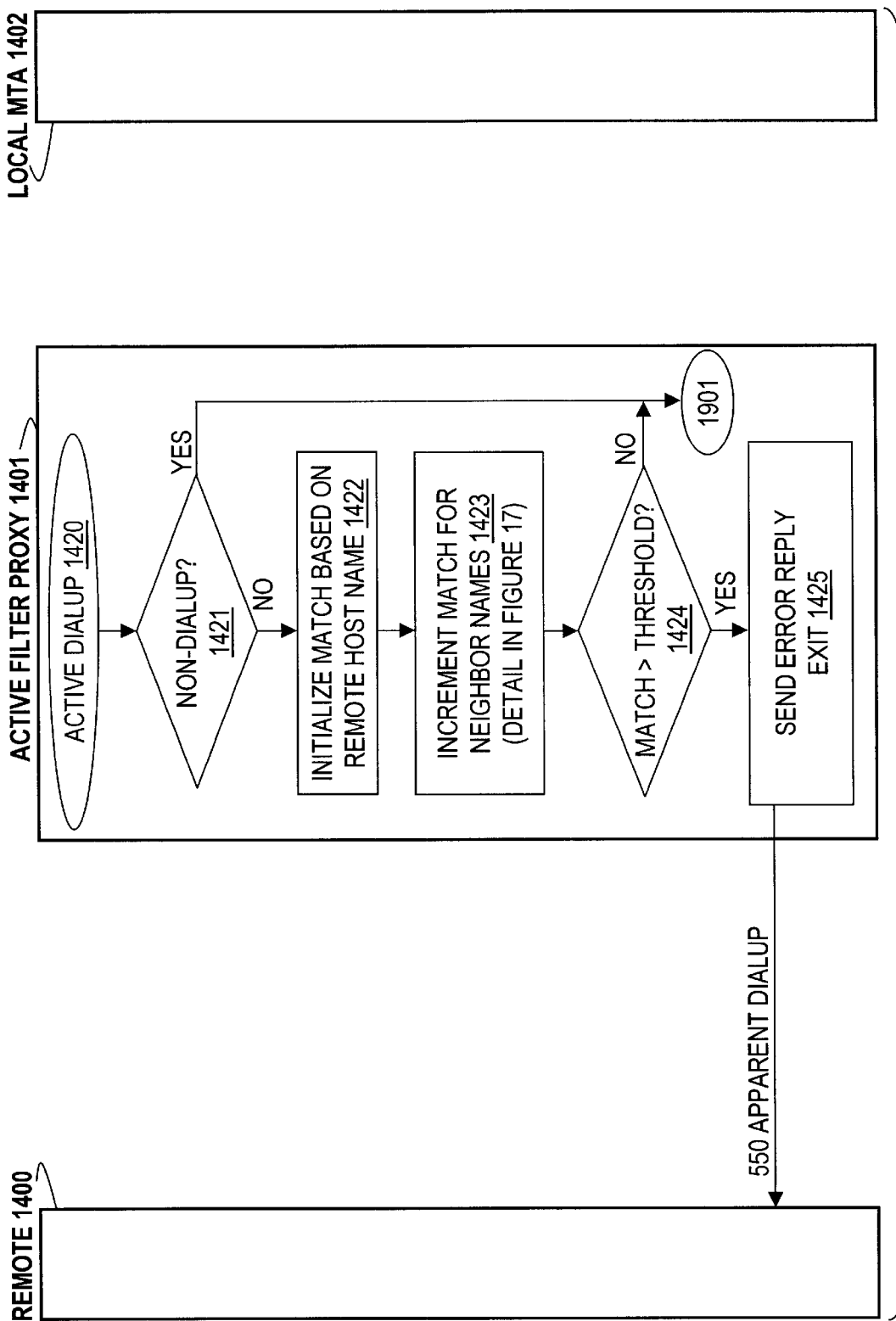
FIGURE 16. ACTIVE DIALUP TEST

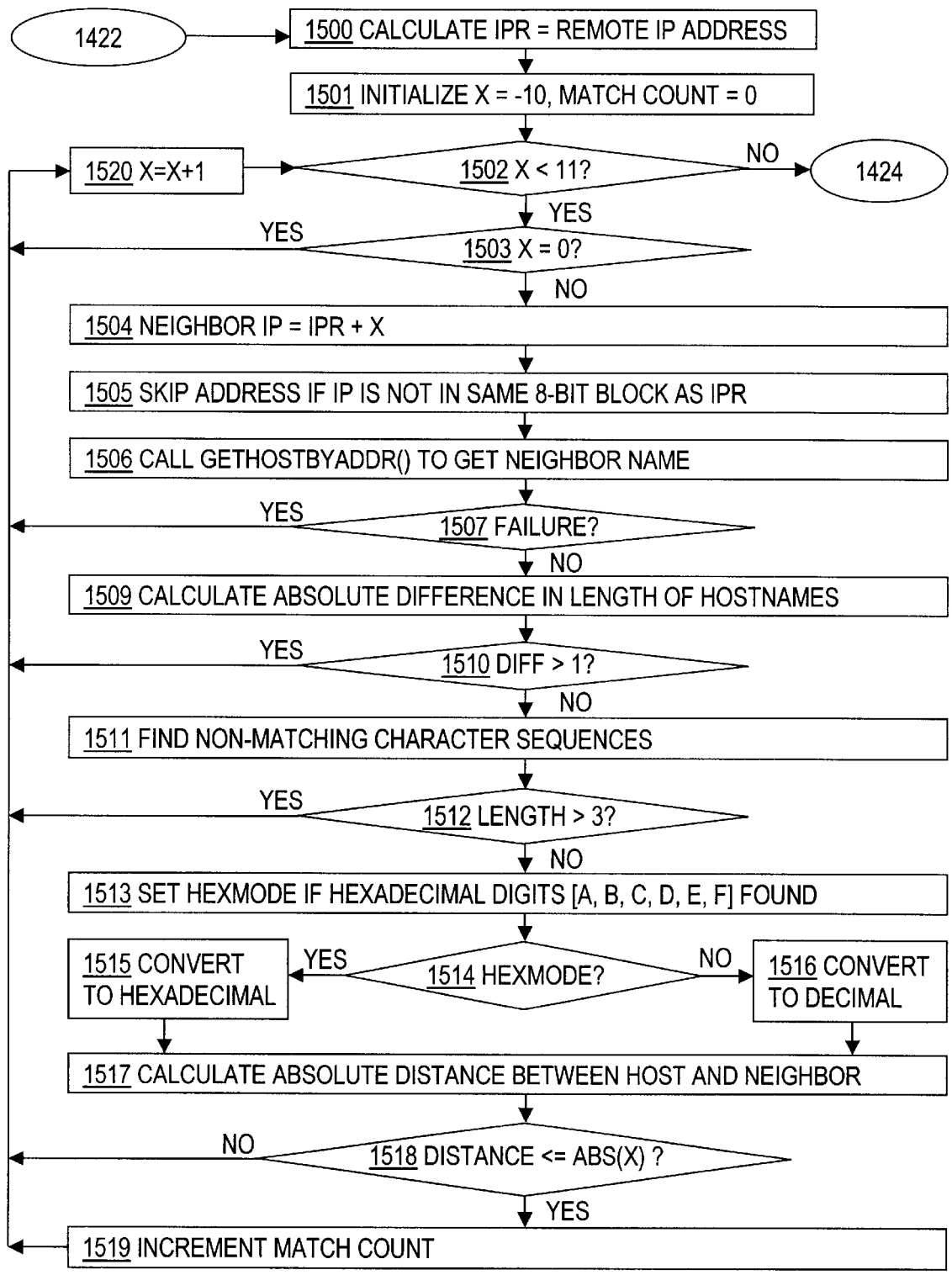
FIGURE 17. DETAILS OF FIGURE 16 STEP 1423

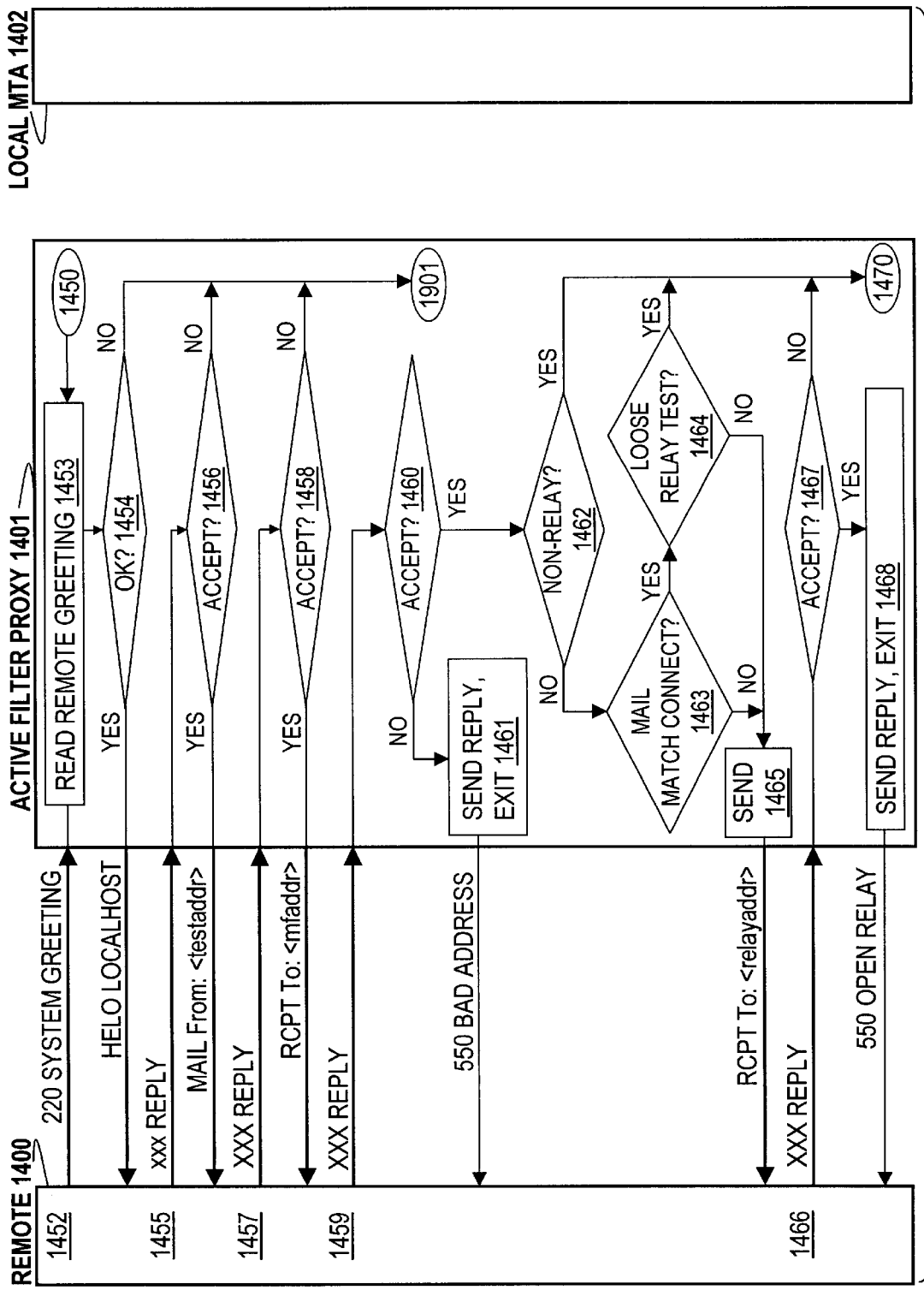
FIGURE 18. ACTIVE RELAY TEST

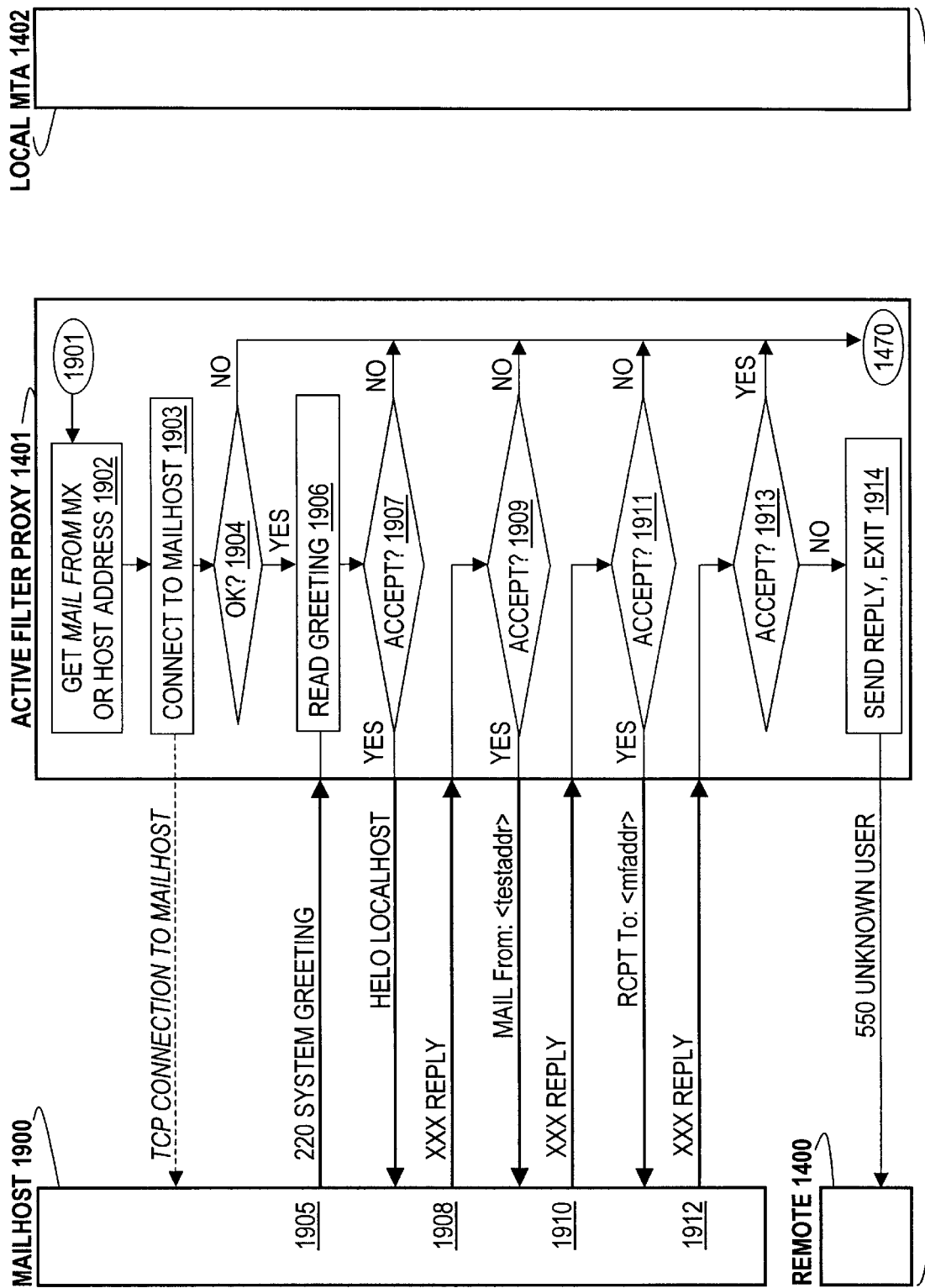
FIGURE 19. ACTIVE USER TEST

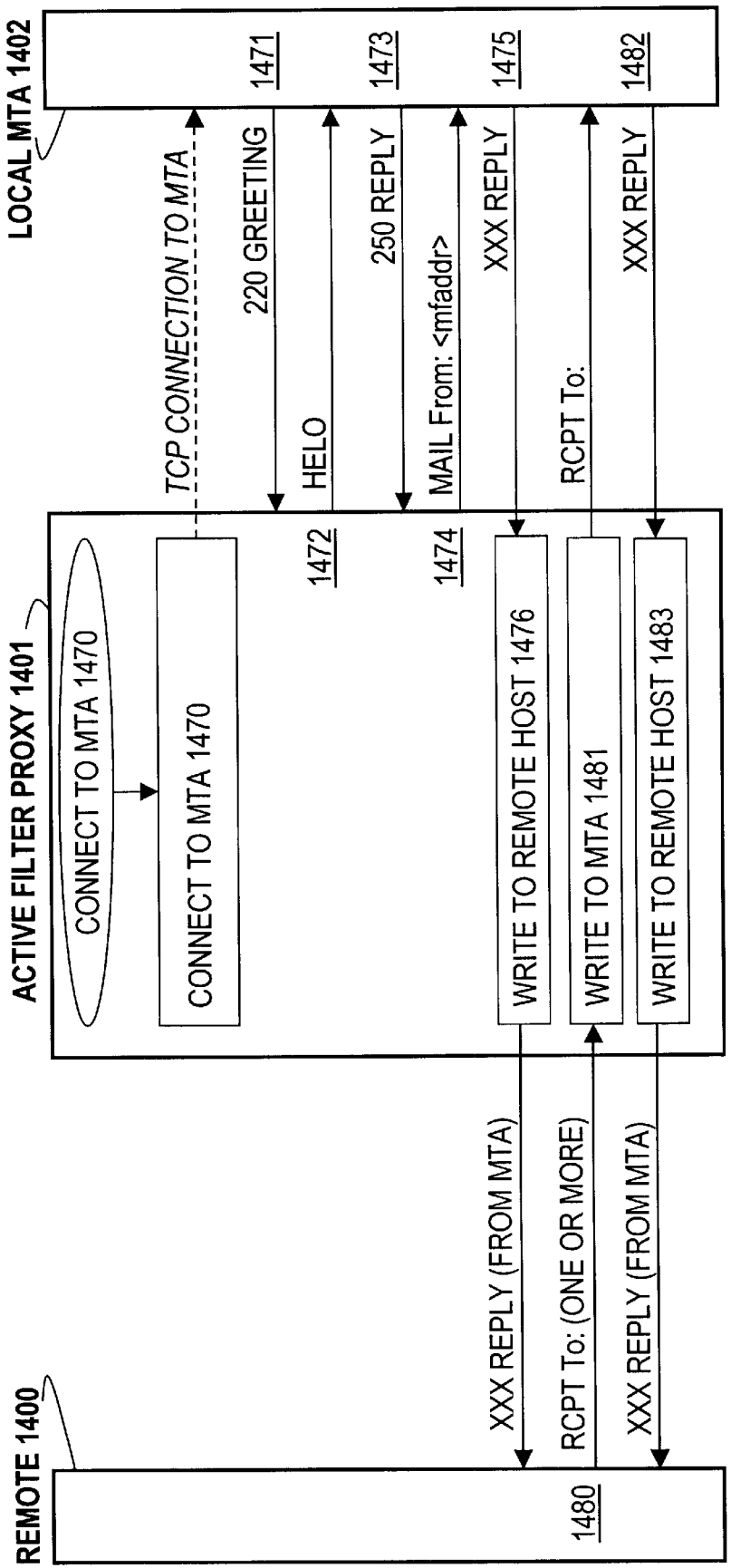
FIGURE 20. CONNECT TO MTA AND EARLY PROTOCOL MESSAGES

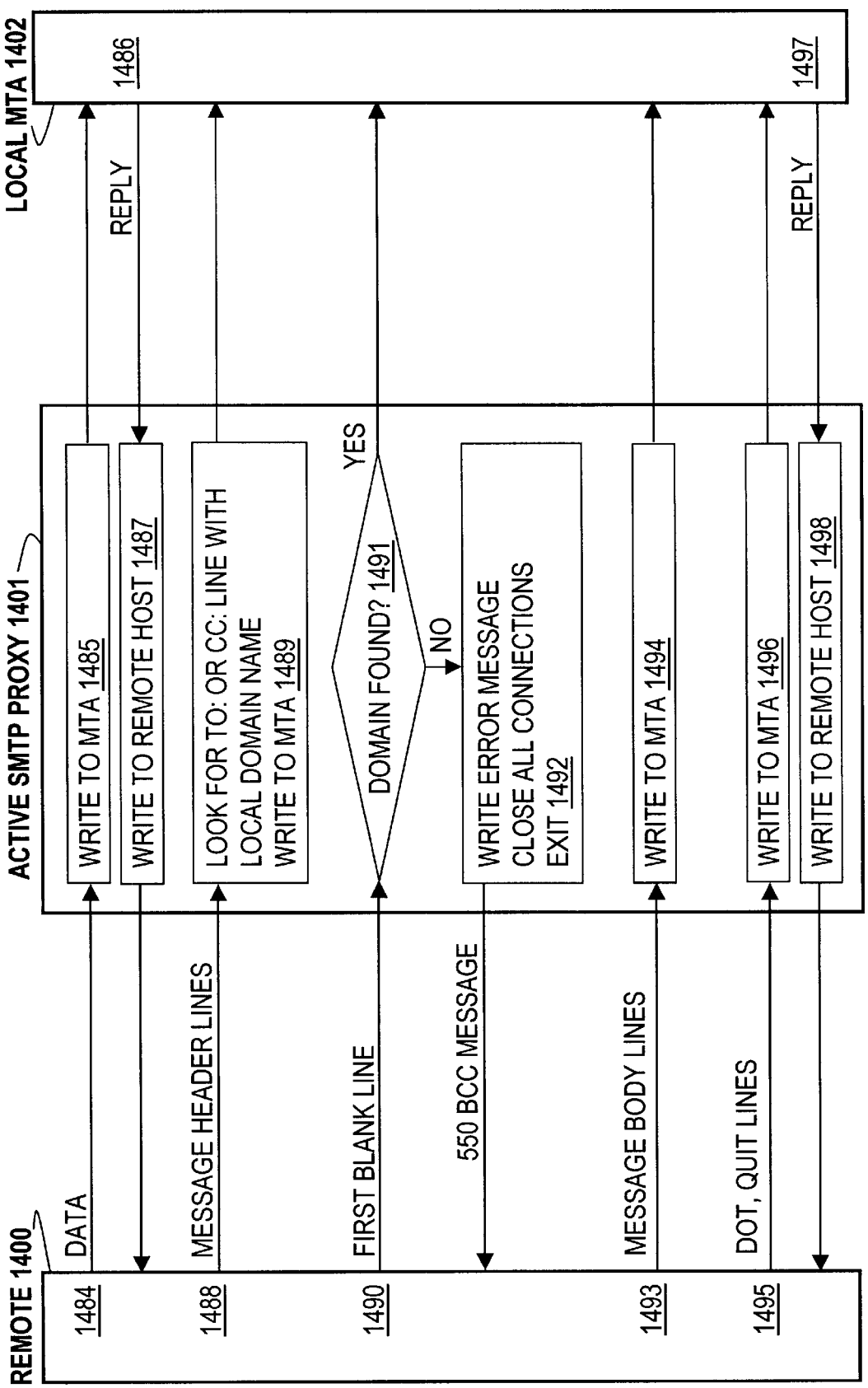
FIGURE 21. DATA TRANSFER PHASE

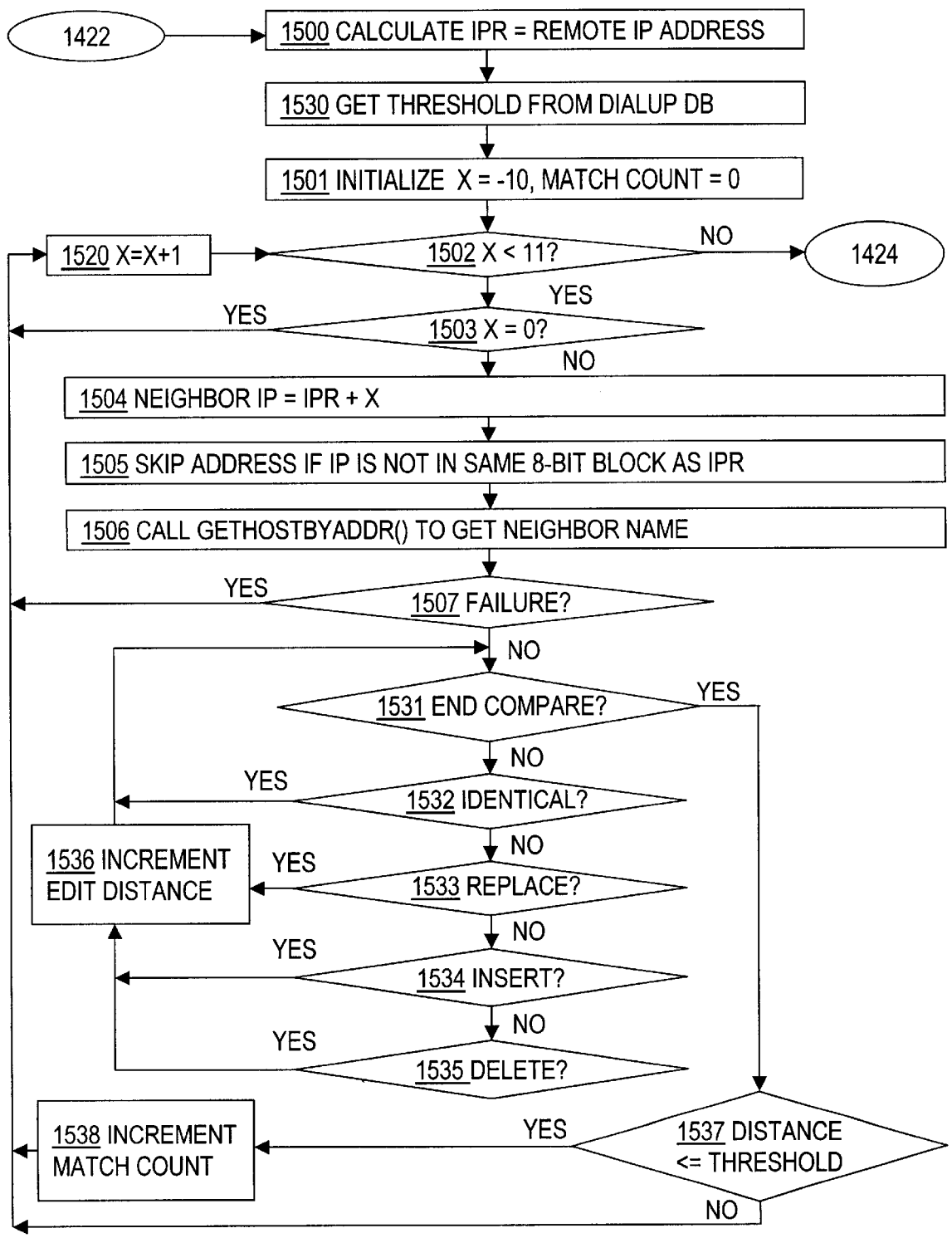
FIGURE 22. DETAILS OF EDIT DISTANCE METHOD
(ALTERNATIVE FIGURE 16 STEP 1423)

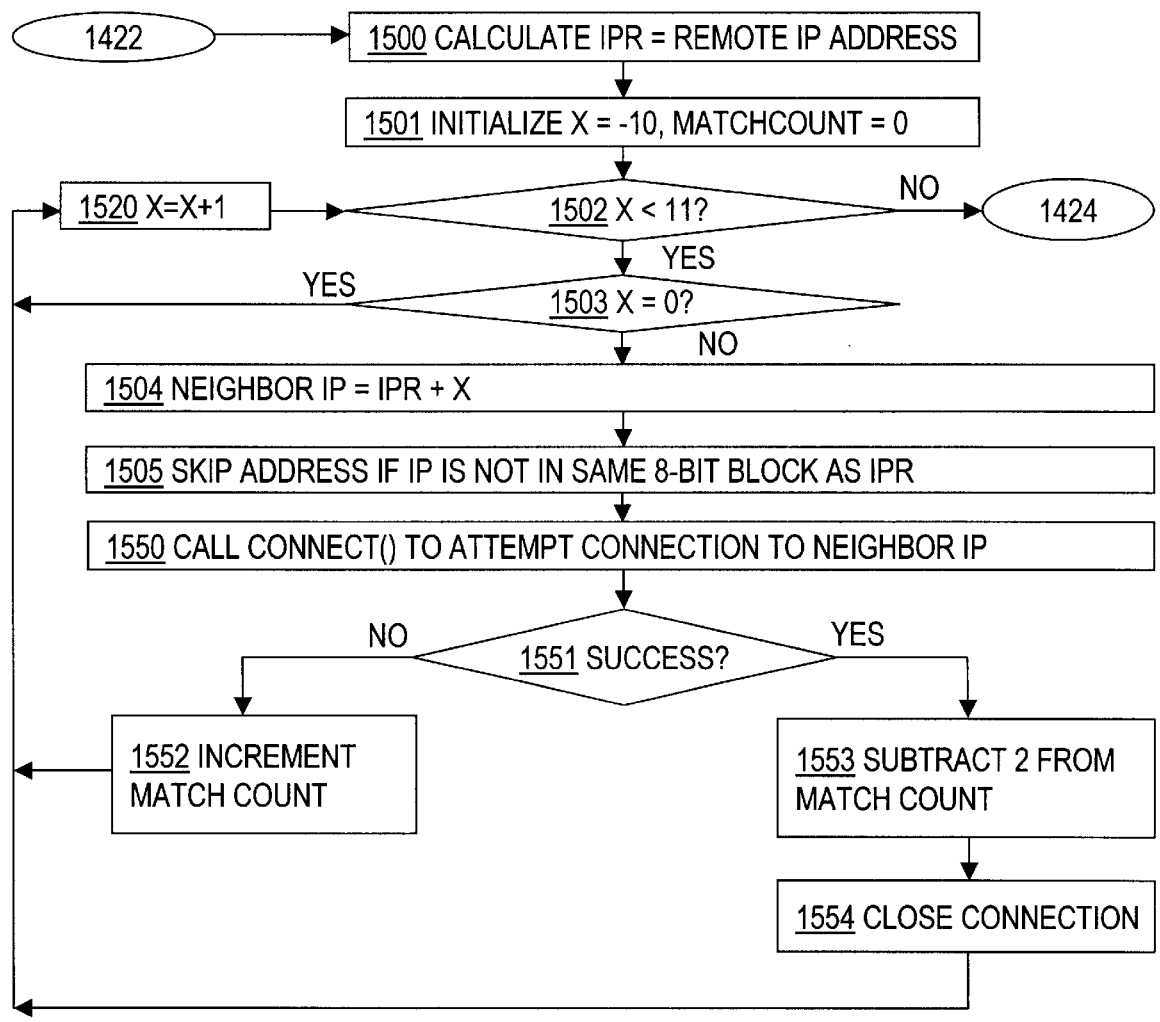
FIGURE 23. DETAILS OF NEIGHBOR CONNECTION METHOD
(ALTERNATIVE FIGURE 16 STEP 1423)

METHOD AND APPARATUS FOR FILTERING JUNK EMAIL

BACKGROUND OF THE INVENTION

1. Field of the Invention

This invention generally concerns electronic messaging. In particular, the present invention concerns a system for filtering undesired electronic mail.

2. Description of the Related Art

Generally, the term "spam" has come to refer to posting electronic messages to news groups or mailing to addresses on an address list the same message an unacceptably large number (generally, 20–25) of times. As used herein, the term "spam" or "junk mail" refers to the sending of unsolicited electronic messages (or "email") to a large number of users on the Internet. This includes email advertisements, sometimes referred to as Unsolicited Commercial Email (UCE), as well as non-commercial bulk email that advocates some political or social position. A "spammer" is a person or organization that generates the junk mail.

The principal objection to junk mail is that it is theft of an organization's resources, such as time spent by employees to open each message, classify it (legitimate vs. junk), and delete the message. Time is also spent by employees following up on advertising content while on the job. In addition, there is an increased security risk from visiting web sites advertised in email messages. Employees may also be deceived into acting improperly, such as to release confidential information, due to a forged message. Still yet, there is a loss of the network administrator's time to deal with spam and forged messages, as well as the use of network bandwidth, disk space, and system memory required to store the message. Finally, in the process of deleting junk mail, users may inadvertently discard or overlook other important messages. Another objection to junk mail is that it is frequently used to advertise objectionable, fraudulent, or dangerous content, such as pornography, illegal pyramid schemes or to propagate financial scams.

Spam can also be a serious security problem. For instance, the recent Melissa virus and ExploreZip.worm have been spread almost exclusively via email attachments. Such viruses are usually dangerous only if the user opens the attachment that contains the malicious code, but many users open such attachments.

Email may also be used to download or activate dangerous code, such as Java applets, Javascript, and ActiveX controls. Email programs that support Hypertext Markup Language (HTML) can download malicious Java applets or scripts that execute with the mail user's privileges and permissions. Email has also been used to activate certain powerful ActiveX controls that were distributed with certain operating systems and browsers. In this case, the code is already on the user's system, but is invoked in a way that is dangerous. For instance, this existing code can be invoked by an email message to install a computer virus, turn off security checking, or to read, modify, or delete any information on the user's disk drive.

Both spammers, and those who produce malicious code, typically attempt to hide their identities when they distribute mail or code. Instead of mailing directly from an easily-traced account at a major Internet provider, they may, for instance, send their mail from a spam-friendly network, using forged headers, and relay the message through intermediate hosts. Consequently, the same mechanisms that can be used to block spam can also be used to provide a layer of protection for keeping malicious code out of an organization's internal network.

Simple Mail Transfer Protocol (SMTP)

Simple Mail Transfer Protocol (SMTP) is the predominant email protocol used on the Internet. It is a Transmission Control Protocol/Internet Protocol (TCP/IP) communication protocol that defines the message formats used for transfer of mail from one Message Transfer Agent (MTA) via the Internet to another MTA. As shown in FIG. 1, Internet mail operates at two distinct levels: the User Agent (UA) and the MTA. User Agent programs provide a human interface to the mail system and are concerned with sending, reading, editing, and saving email messages. Message Transfer Agents handle the details of sending email across the Internet.

According to SMTP, an email message is typically sent in the following manner. A user 1040 (located at a personal computer or a terminal device) runs a UA program 1041 to create an email message. When the User Agent completes processing of the message, it places the message text and control information in a queue 1042 of outgoing messages. This queue is typically implemented as a collection of files accessible to the MTA. In some instances, the message may be created on a personal computer and transferred to the queue using methods such as the Post Office Protocol (POP) or Interactive Mail Access Protocol (IMAP).

The sending network will have one or more hosts that run a MTA 1043, such as Unix sendmail by Sendmail, Inc. of California or Microsoft Exchange. By convention, it establishes a Transmission Control Protocol (TCP) connection to the reserved SMTP port (TCP 25) on the destination host and uses the Simple Mail Transfer Protocol (SMTP) 1044 to transfer the message across the Internet.

The SMTP session between the sending and receiving MTAs results in the message being transferred from a queue 1042 on the sending host to a queue 1046 on the receiving host. When the message transfer is completed, the receiving MTA 1045 closes the TCP connection used by SMTP, the sending host 1043 removes the message from its mail queue, and the recipient 1048 can use his/her configured User Agent program 1047 to read the message in the mail queue 1046.

FIG. 2 is a graphical representation of an example of the SMTP messages sent across the Internet. In this example, sender@remote.dom sends a message to user@escom.com (The top-level domain name "dom" does not actually exist, and is used for illustrative purposes only to avoid referring to a example domain).

The sending host's Message Transfer Agent 1001 sends an email message to the receiving host 1002. At step 1010, the sending MTA opens a TCP connection to the receiving host's reserved SMTP port. This is shown as a dashed line with an italics description to differentiate it from the subsequent protocol messages. This typically involves making calls to the Domain Name System (DNS) to get the IP address of the destination host or the IP address from a Mail Exchange (MX) record for the domain. For example, the domain escom.com has a single MX record that lists the IP address 192.135.140.3. Other networks, particularly large Internet Service Providers (ISPs), might have multiple MX records that define a prioritized list of IP addresses to be used to send email to that domain.

The sending MTA typically establishes the connection by: (1) making a socket system call to acquire a socket (a structure used to manage network communications); (2) filling in the socket structure with the destination IP address (e.g., 192.135.140.3); (3) defining the protocol family (Internet) and destination port number (by convention, the MTAs use the reserved TCP port 25); and, (4) making a connect system call to open a TCP connection to the remote MTA and returning a descriptor for the communications channel.

The process of opening a TCP connection causes the receiving host's operating system (or networking software) to associate the TCP connection with a process that is listening on the destination TCP port. The TCP connection is a bi-directional pipe between the sending MTA 1001 on the sending host and the receiving MTA 1002 on the receiving host. SMTP is line-oriented, which means that all protocol messages, responses, and message data are transferred as a sequence of ASCII characters ending with a line feed (newline) character.

In step 1011, the receiving MTA sends a service greeting message when it is ready to proceed. The greeting message typically gives the host name, MTA program and version number, date/time/timezone, and perhaps additional information as deemed by the host administrator. The greeting lines begin with the three-character numeric code "220". By convention, the last/only line begins with the four-character sequence "220" and any preceding lines begin with "220-".

When the greeting message is received, the sending MTA may optionally send a HELO message, step 1012, that lists its host name. Some mail servers require the sending host to issue this message, and others do not. If the client (sending) MTA issues the HELO message, then the server (receiving MTA) issues a HELO response, step 1013, that lists its name. For Extended SMTP (ESMTP), the sending host sends an EHLO message that performs essentially the same function as the HELO message. In this case, the receiving host generates a multi-line reply listing the extended SMTP commands that it supports.

At step 1014, the sending MTA sends a MAIL From: message to identify the email address of the sender of the message, e.g., sender@remote.dom. By convention, the Internet address is formed by concatenating the sending user's account name, the "@" sign, and the domain name of the sending host. The resulting address is typically enclosed in angle-brackets, however, this is not usually required by the receiving mail server. It is noted that spammers can easily forge the MAIL address.

At step 1015, the receiving mail server sends either a "250" response if it accepts the MAIL message or some other value such as "550", if the message is not accepted. The receiving mail server may reject the address for syntactical reasons (e.g., no "@" sign) or because of the identity of the sender.

At step 1016, the sending MTA sends a RCPT To: message to identify the address of an intended recipient of the message, e.g., user@escom.com. Again, this is a standard Internet address, enclosed in angle-brackets. At step 1017, the receiving server replies with a "250" status message if it accepts the address, and some other value if the MAIL message is not accepted. For example, sendmail 8.9.3 issues a 550 message if the specified recipient address is not listed in the password file or alias list. The sending MTA may send multiple RCPT messages (step 1016), usually one for each recipient at the destination domain. The receiving server issues a separate "250" or "550" response as shown in step 1017 for each recipient.

At step 1018, the sending mail server sends a DATA message when it has identified all of the recipients. The server sends a response (nominally, "354", as shown in step 1019) telling the sending server to begin sending the message one line at a time, followed by a single period when the message is complete.

When the sending MTA receives this reply, it sends the text of the email message one line at a time as shown in step 1020. Note that it does not wait for a response after each line during this phase of the protocol. The message includes the SMTP message header, the body of the message, and any attachments (perhaps encoded) if supported by the sending User Agent program.

When the message transfer has been completed, the sending MTA writes a single period (".") on a line by itself (step 1021) to inform the destination server of the end of the message. The receiving MTA typically responds (step 1022) with a "250" message if the message was received and saved to disk without errors. The sending MTA then sends a "quit" (step 1023) and the receiving MTA responds with a "221" message as shown in step 1024 and closes the connection.

FIG. 3 shows the same information, using a text representation of the SMTP messages between the sending MTA (remote.dom) and receiving MTA (escom.com). The first character of each line indicates the direction of the protocol message. The ">" character indicates the direction of the protocol message sent by the sending MTA, and "<" indicates the direction of a message sent by the receiving MTA. These characters do not form a part of the message being transmitted.

The email message header is transferred at the beginning of the message and extends to the first blank line. It includes Received: lines added by each MTA that received the message, the message timestamp, message ID, To and From addresses, and the Subject of the message. The message header is followed by the body of the message (in this case, a single line of text), the terminating period, and the final handshaking at the end of the message. Here, the term "message" alone refers to the overall email message as well as the multiple protocol messages (e.g., HELO, MAIL and RCPT) that are used by SMTP.

Spammer Techniques

The two primary techniques used by spammers are relaying and directing SMTP from a dialup PC. Approximately one-half of all spam attempts are relayed from an attacker through an intermediate site that permits relaying. Many of these open relay sites have been recently added to the Internet without regard to good system administration practices, and consequently may permit relaying without regard to its consequences.

Approximately one-third of junk mail is sent directly from a dialup PC to the recipient mailhost. The use of direct SMTP from a PC provides the ability to forge email. As open relays are closed, this percentage is likely to rise. The remainder (approximately 15%) of junk mail is from users that appear to have an account on the sending network.

Regardless of which technique is used, however, almost all junk mail have similar characteristics. Junk mail messages almost invariably have a forged email address in order to discourage complaints by the recipients of the spam. Contact information is provided somewhere in the body of the message, and may be another email address, a link to a web page or a telephone number. In addition, junk mail frequently does not include the recipient's address in the header of the message. This is done primarily as a performance optimization.

In addition, junk mail is usually sent from a "throwaway" account, in which the spammer sends a batch of messages (usually thousands of messages) and then moves on after being canceled. Similarly, spamming networks sometimes perform spam runs from a mail server, then take the host offline to avoid complaints. Such networks operate until they are widely blacklisted, then register a new domain and carry on business under a different name.

Any person with an email address at an Internet Service Provider (ISP) account can send junk email. After acquiring an address list, the user can send a message to each address on the list using the mailer program provided by the ISP. However, as shown in the examples in FIGS. 2 and 3, most ISPs record the sender's actual email address in outgoing message headers. If recipients complain, the ISP will often terminate the user's account, sometimes billing cleanup fees in accordance with the network's Acceptable Use Policy (AUP). Consequently, this technique is not favored by most spammers.

Relay Abuse

Relaying is not inherently bad. Early mailhosts relayed as a matter of courtesy and convenience for system administrators to test their mail systems. In addition, most networks relay internally so that not all network hosts have to be able to handle Internet mail. Small network subscribers often relay through a "smart host" provided by their ISP that is configured to handle the more complicated aspects of Internet mail. This arrangement is intentional and usually is not abused.

The problem occurs when a host indiscriminately relays mail from any domain to any other domain. These hosts are known as "open relays". The practice is sometimes referred to as "third-party relaying", since the relay host is neither the initial sender of the message nor the intended recipient.

Open relays permit the spammer to easily forge his/her identity. FIG. 4 shows how a spammer at spam.dom 1060 relays mail via relay.dom 1061 to a variety of different users at different target domains 1062, 1074, etc. At step 1063, the spammer connects to relay.dom, as described with regard to FIG. 2. For clarity, SMTP responses (greeting messages, 250, etc.) are not shown in this figure.

At step 1064, the spammer forges a MAIL From message listing an address at the open relay host 1061. The forged MAIL address can be at any network, including spam.dom, relay.dom, any of the netn.dom hosts, or somewhere else. The forged MAIL From: address may be the same as the From: line in the message header, or it may be different. At one time spammers commonly forged addresses at AOL-.COM or other large networks, because those networks were so well known, but legal action by AOL in particular has largely stopped that practice. The spammer is able to forge the MAIL address usually because he or she is able to override the normal user authentication functions, perhaps as a trusted user of a network server or as the operator of a single-user PC.

At steps 1065, 1066, the spammer sends multiple RCPT messages with a list of destination addresses. Finally, step 1068, the spammer sends a DATA message, the text of the email message, a period, and a quit message to relay.dom. When relay.dom receives the message, it stores the message in its mail queues until it has forwarded the message to each of the target addresses, or until the message has timed out. If it cannot deliver a message, it will typically retry periodically (perhaps every 10 minutes or perhaps once per day). The relay host will usually keep undelivered messages in its queue for up to a week.

The result is that spam.dom will send the message once and the relay host 1061 will forward a copy of the message to each host 1062, 1074 in the address list. For example, relay.dom will open a connection 1070 to host net1.dom 1062, send the MAIL message 1071, send the RCPT message 1072, and then send the text of the message 1073. The relay host 1061 repeats this process for host net2.dom 1074, as shown by steps 1075–1078, and any remaining target hosts (not shown). If spam.dom listed 100 different hosts in the RCPT addresses it sent to relay.dom, then relay.dom will attempt to send the message 100 times.

The difficulty in filtering relayed junk mail is shown in part by this example. If the spammer 1060 forges the MAIL From address to match the relay host (e.g., "good@relay.dom") then as observed by net1.dom 1062, the message appears to be from a legitimate user at relay.dom. This example shows abuse of one open relay. The current generation of relaying tools will also permit the spammer to enter a list of open relay hosts, and the software will use different relays for different groups of addresses. Thus, different users at the same target network may receive spam relayed via different paths.

The primary technique in blocking relayed spam involves databases of blacklisted IP addresses, which can be consulted by spam filtering software to determine whether the sending host is an open relay. For example, sendmail 8.9.3 provides an option to look up the IP address of the sending host in such a database, and reject the mail if the database indicates that the IP address is an open relay. Examples of online blacklist databases include, for instance, the Mail Abuse Prevention System (MAPS) Realtime Blackhole List (RBL) and the Internet Mail Relay Services Survey (IMRSS).

The problem with such blacklisting databases is that they are static rather than dynamic. Consequently, an open relay must be abused at least once, reported to the database, confirmed by the database organization, then added to the database, before it will be blocked. Because database methods are static, the entry for a host must be manually removed when the host's mailer is fixed so it no longer relays. This takes an exchange of messages, re-testing, etc. In addition, these remote database methods involve connections to the database server, a lookup on that server (which may be doing lookups for hundreds of other users). Because these databases are global, they are not under control of local administrators. That is, if an organization has a customer that has an open relay, then the organization must either stop using blacklists such as MAPS or IMRSS, or risk having mail from the customer blocked because of an entry in the MAPS or IMRSS databases.

These database organizations typically take referrals from administrators throughout the Internet for open relay addresses. The organization then typically verifies the relay status before placing the address in the database. In the general case, an open relay can be confirmed by attempting to send a message from user A to user B, using the candidate relay address as an intermediate forwarder. The relay host may in turn relay the message through additional hosts in its network (known as "multi-hop" relaying), before sending it to user B. However, if user B eventually receives the message, then the host must have relayed.

A much simpler test can be performed by simply telneting to the SMTP port (TCP 25) of the suspected open relay, then typing in SMTP commands as indicated in the ">" sequences in FIG. 5 and observing the responses indicated in the "<" sequences. If the two networks are unrelated (i.e., the remote host is not acting as a legitimate smart host for the local organization) and the suspected relay host returns a "250" response to the RCPT message, then the remote host probably is an open relay. After the response to the RCPT message is received, the testing host can close the test connection without actually sending any data. However, this test is not perfectly accurate, as it fails to identify multi-hop relays. There are also some hosts that give "250" responses to the RCPT message, but actually reject the relay attempt during later mail processing.

PC-based SMTP Direct

FIG. 6 shows how a spammer can use a dialup PC 1080 running a SMTP direct program 1081 that is able to establish SMTP connections 1044 directly to the SMTP port of the target mailhost. The term "dialup" as used herein refers to a class of Internet subscribers characterized by an inability to service incoming mail requests (i.e., not a mail server), having a related if not sequential name space, often using dynamically-assigned addresses, and generally existing at the lowest tier of pricing offered by an ISP. It includes various means of connecting, not all of which involve literally dialing in to the ISP, for example, wired cable or pocket radio. The spammer typically provides a single copy of a message 1082 and a list of addresses 1083. The program establishes an SMTP connection 1044 to each remote MTA 1045, delivers the message, and proceeds to the next entry in the address list.

Because the Dialup SMTP Direct program 1081 runs under the control of the spammer, the program can be configured to forge any email address, hostname, or any field (e.g., the From: address) in the message header. Consequently, a message received by a user 1048 that is sent by this means may appear to be sent by a co-worker, from one's manager, from friends on another network, or even by the recipient himself The primary method for blocking junk mail from SMTP Direct hosts is by using centralized blacklists. These include the MAPS Dialup User List (DUL). The DUL lists various blocks of IP addresses that are known to be used for dialup PCs.

Current Solutions

The solutions that are presently available to block junk mail fall into seven general categories. First, the use of centralized blacklisting databases, such as described above for the RBL, IMRSS, and DUL. Second, the use of local blacklisting databases, such as sendmail checking a local database and blocking email that matches entries in the database. Third, blocking mail from nonexistent domains, such as for instance if sendmail receives "MAIL From: <sender@nonexistent.dom>", it will reject the mail because it cannot find the domain "nonexistent.dom" listed in the Domain Name System (DNS).

Fourth, whitelisting methods are used, so that a filter can reject all sender addresses that are not included in a local whitelist of permissible addresses. Fifth, Bcc filtering may be used to reject email from unknown hosts that do not list the recipient's email address in the header of the message. And sixth, client methods may be used to reject junk mail located in the user's mailbox without downloading the mail to the user's mail program (UA). Filtering of client protocols such as POP provides relief to individual users, but still allows junk mail to be stored on the SMTP server.

Seventh, secure electronic mail, such as based on the emerging Secure/Multipurpose Internet Mail Extension (S/MIME) and OpenPGP standards uses public key cryptography to provide security services such as secrecy (confidentiality), integrity (ability to detect modification), authentication, and non-repudiation. Spammers are unlikely to use integrity and non-repudiation services, in particular, since these involve a digital signature signed with the sender's private key. However, these systems do not provide a solution to spam, since not everyone uses public key cryptography. Further, these services typically operate as part of the User Agent, so S/MIME or OpenPGP-protected spam can still be relayed or sent from dialup computers.

SUMMARY OF THE INVENTION

It is therefore a primary object of the invention to provide an email filtering system and method. It is another object of the invention to provide an email filtering system that substantially eliminates security risks and loss of company resources associated with junk mail. It is another object to provide an email filter that operates at the MTA level and performs active filtering based upon characteristics of the incoming connection and the remote host.

In accordance with these objectives, an Active Filter proxy in accordance with a preferred embodiment is provided in a conventional firewall configuration between a remote host and a local MTA. The Active Filter proxy probes the sending host at the time it connects and implements a series of tests to determine if the remote host is likely to be either a dialup customer (Active Dialup testing), or an open relay (Active Relay testing). It also queries the mail server that handles email to the supposed sender of the message to determine if the mail server will accept email for that address (Active User testing). Together, these tests address the primary sources of junk mail.

These tests reject SMTP email based on characteristics of the received SMTP protocol fields and the configuration of the remote host. The Active Dialup test considers certain characteristics typical of dialup PCs, which include the inability to operate as a server and generally a sequential naming scheme. The Active Relay test concludes that if the remote host appears to relay for a test connection, then it will probably relay for spammers. The Active User test detects obvious forgeries by blocking email where the configured mailhost for the sender will not accept a reply to that address.

Because these techniques are performed at the time of the initial SMTP data connection, they characterize the remote host as it is configured at that time, thus avoiding the latency problems of static blacklisting databases. Further, rejected mail does not consume any disk storage on either the proxy host or the mailhost. Instead, the rejected message remains on the remote host, whether an open relay or dialup PC.

Thus, junk mail that is blocked by at least one of these tests does not make it onto the local mail server or user clients. Consequently, it cannot be used to propagate viruses or other malicious code and it cannot distract the intended recipient from his/her work. The Active Filtering proxy can be chained with other content filtering proxies in a conventional fashion to reject other objectionable or malicious content in the body of the message.

Minimal involvement is required by email administrators, when compared with the administrative cost of removing junk mail from mail servers, cleaning up after a virus or other malicious code attack, complaining about junk mail, and solving other problems. Administrator involvement generally consists of reviewing logs and adding IP address blocks and domain names to trusted databases where necessary.

It is not practical, and perhaps not possible, to blacklist all current and future sources of spam, or to whitelist all benign sources of legitimate email, because the Internet grows and changes so quickly. However, it is readily possible for most administrators to define the relatively few (perhaps tens or hundreds) trusted domain names and to rely on the Active Filtering methods to characterize the remainder of the hosts that connect.

The method also provides the ability to automatically append IP addresses detected by certain sensor points back into the IP filtering list, so that those hosts can be subsequently blocked by a simple IP lookup mechanism. This provides a performance improvement by quickly rejecting subsequent connections from IP addresses that have already been rejected by one of the Active Filtering tests.

The present invention is compatible with all known SMTP MTAs. The architecture permits a natural separation of responsibilities for the proxy and the MTA. The proxy offloads the rejection of junk mail, so that the MTA need only consider legitimate email. The MTA may provide other conventional spam-filtering methods of its own (for example, rejecting non-existent MAIL From domains) or may reject mail because the RCPT user does not exist on the local network.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 1 depicts a prior art illustration of the general architecture for Internet electronic mail using the Simple Mail Transfer Protocol (SMTP).

FIG. 2 is a prior art illustration of a graphical representation of an exchange of SMTP protocol messages involved in transferring a single electronic mail message from one MTA to another.

FIG. 3 is a prior art illustration of a printout of the message of FIG. 2, showing the protocol transactions, message header, and message body.

FIG. 4 is a prior art illustration that shows how a bulk mail program takes advantage of an open relay host elsewhere on the Internet to store a single message and a list of addresses, causing the relay to forward the message to each address in the address list at recipient MTAs. Spammers typically use relaying to offload processing from their computer and obscure their involvement in sending the message.

FIG. 5 is a prior art illustration that shows the SMTP messages used to perform a simple test of a remote host to determine if it is an open relay.

FIG. 6 is a prior art illustration that shows how spammers may transfer mail directly from a SMTP direct program on a personal computer to the input port of a MTA. Spammers typically use this method to make message forgery easier and to avoid their network's controls on outgoing email.

FIG. 7 is a block diagram of the Active Filter proxy server system in accordance with the preferred embodiment.

FIGS. 8–12 show specific architectures in accordance with the present invention when deployed with other email processing systems.

FIG. 8 shows the general architecture, in which the Active Filtering proxy is connected in a preferred embodiment as part of a firewall between the Internet 1100 and the organization's MTA.

FIG. 9 shows the proxy and MTA residing on the same computer.

FIGS. 10 and 11 show the present invention implemented as part of a SMTP wrapper process or in the MTA itself, respectively.

FIG. 12 shows how a proxy may be chained with a content-filtering proxy for enhanced control over incoming email.

FIG. 13 shows an overview of the protocol transactions exchanged in transferring a single email message from a remote host, the Active Filtering proxy server, and the protected MTA.

FIGS. 14–23 show the details of the protocol interactions and processing flow for the transfer of a single email message from a remote host 1400, through an Active Filtering proxy server 1401, to a local MTA 1402.

FIG. 14 shows the initial connection from the remote host to the proxy, a blacklist check, and display of a greeting message to the remote host.

FIG. 15 shows the processing of the remote host's HELO and MAIL transactions by attempting to open a reverse test connection 1418 to the remote host.

FIG. 16 shows the general framework for the Active Dialup test.

FIG. 17 shows details of the preferred embodiment for a sequential name check used in the Active Dialup test.

FIG. 18 shows the Active Relay test.

FIG. 19 illustrates the Active User verification method.

FIG. 20 shows how the proxy opens a connection to the local MTA 1403 to transfer a valid message.

FIG. 21 shows the transfer of the data in the email message (header, body, attachments, etc.) and how the connection is closed.

FIG. 22 illustrates an alternative embodiment for the Active Dialup test based upon edit distances between the remote host name and its neighbors' names.

FIG. 23 shows a second alternative embodiment for the Active Dialup test based upon the inability to establish reverse test connections to neighbors of the remote host.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Architectures

FIG. 7 illustrates the design of the Active Filtering proxy server. The server runs as a process 1104 on a host computer (preferably a firewall host 1103 as shown in FIG. 8), interposed between remote hosts on the Internet 1100 and a mailhost 1105. The proxy design requires services provided by the computer hardware platform 1091 and the operating system 1090. The hardware platform 1091 includes one or more processors, memory, disk storage, and network interfaces. The number of processors and amount of memory required depends upon the anticipated processing load. A small network might suffice with a single processor and 32 megabytes of random access memory (RAM), while a larger network might require multiprocessor implementation with hundreds of megabytes of RAM. The hardware platform provides disk storage for the program used to implement proxy 1104, operating system 1090, various configuration databases (1093–1098), and a log file 1099. Two network interfaces are preferred if the mailhost 1105 is to be hidden behind a firewall. The platform may also include a console (not shown) for configuring and controlling the server, however, this may also be performed via the network.

The operating system 1090 provides an execution environment for the proxy process of proxy 1104 using the hardware 1091. It provides Transmission Control Protocol (TCP) socket services, Domain Name System (DNS) services, file system services, memory management services, and logging services. In modem operating systems (such as Solaris, Linux, AIX, and Windows NT), the file and memory management functions cooperate to provide access to a virtual memory space that exceeds the amount of physical memory available. Since the program image of proxy 1104 and all of the configuration files except the blacklist database 1095 and log 1099 are read-only, these may be read in once from disk then subsequently accessed from virtual memory.

The operating system also provides the abstraction of TCP sockets 1092 and 1089. Each socket identifies a remote host endpoint, such that the socket 1092 is associated with a remote host (shown subsequently as FIG. 13 item 1400) and the socket 1089 is used to control communications with the local Message Transfer Agent 1402 (FIG. 13). An additional socket (not shown) is used for each test connection, e.g., 1418 (FIG. 15) or 1903 (FIG. 19). The operating system also provides a means, such as the UNIX Internet Daemon (inetd), for dispatching programs (such as the proxy 1104) when connections are received from the Internet 1100.

Configuration databases include Trusted DB 1093, which is used to identify trusted networks that are permitted to bypass further filtering; Whitelist DB 1094, which contains individual email addresses that are permitted to bypass further filtering; Blacklist DB 1095, which identifies IP addresses of remote hosts that will be blocked immediately after they connect to the proxy server; Relay DB 1096, which contains configuration data for the Active Dialup filter, including addresses of untrusted hosts that are known not to be dialup clients; Dialup DB 1097, which identifies untrusted hosts that are known not to be dialup clients; Configuration DB 1098, which includes general data such as the IP address and port for the Mailhost 1105, permissible domain names for RCPT messages, etc; and System Log 1099, as typically provided by the UNIX syslog facility or Windows NT Event Log service. The preferred embodiment is for each database to be provided as a separate file. However, alternative embodiments may provide for merging some or all databases into a single configuration database, however preferably excluding the Log 1099.

Further to the preferred embodiment, the Active Filtering Proxy 1104 is run once for each incoming connection received from the Internet 1100, reads the configuration databases 1093–1098, interacts with the remote host to determine if it is likely to be a source of junk mail, and either closes the connection (without any mail being transferred) or opens a connection via the socket 1089 to permit the remote host to communicate with the mailhost 1105. In either case, the proxy writes one or more log entries to the Log 1099. The proxy does not save the message to a local file but instead performs all transfers from memory buffers. That is, the proxy receives a SMTP message from socket 1092 into a memory buffer, optionally validates the contents of the buffer, and then sends the contents of the buffer via socket 1089 to the mailhost 1105. In the preferred embodiment, the proxy exits after processing each message; however, alternative embodiments may provide for a single proxy that simultaneously handles multiple messages.

FIGS. 8–12 show five architectures that provide Active Filtering of junk mail received from the Internet 1100 and addressed to an MTA 1106 on the organization's mail server 1105. The Active Filtering proxy 1104 (FIG. 7) runs on a separate firewall host 1103 (FIG. 8) or on the same mail server host 1107 that is running the MTA 1106 (FIG. 9). The methods can be implemented as part of a mail wrapper 1110 (FIG. 10), or can be integrated as part of the MTA 1113 itself (FIG. 11). If it runs as a separate proxy server 1103 (FIG. 8), it can be chained with other proxy servers 1116 to implement more complex filtering policies (FIG. 12).

The organization's network includes, at a minimum, a router 1101, Internet connection 1100, Local Area Network (LAN) 1102 and MTA 1106. Accordingly, these components are common to all of the architectures shown in FIGS. 8–12. The packet-filtering router 1101 routes packets from the Internet 1100 to the SMTP proxy server via the LAN 1102. The router operates at the network layer of the protocol reference model using the Internet Protocol version 4 (IPv4). However, with appropriate changes to the socket programming interface, the present invention also operates with other network layer protocols such as Internet Protocol version 6 (IPv6) or Novell Netware.

Internet connection 1100, which is between the router 1101 and external hosts, is typically provided at the physical layer of the protocol hierarchy by wired or dialup circuits (such as dialup modem, ISDN, ADSL, or cable TV) using link-layer protocols such as Point-to-Point Protocol (PPP) or Single Line Interface Protocol (SLIP). The present invention operates at the application layer and is independent of the Internet connection.

As with FIG. 7, the firewall host 1103 has two separate LAN interfaces 1102 and 1117. LAN 1102 interconnects the Internet 1100 with the firewall host 1103. LAN 1117 connects the firewall host 1103 with the organization's protected servers (e.g., 1105) and workstations (not shown). These LANs are typically Ethernet or Taken Ring technology. However, the present invention is independent of the type of LAN technology (adapters, device drivers) used by the organization.

Each architecture of FIGS. 8–12 has one or more MTAs 1106. These include programs such as Unix sendmail, Microsoft Exchange, Netscape Messaging Server, Lotus SMTP, Apple Internet Mail Server, special-purpose SMTP servers used by the various Internet service providers, and other MTA programs. These MTAs may themselves perform some degree of junk-mail filtering (for example, automated searches of the MAPS Realtime Blackhole List (RBL), MAPS Dialup User List (DUL), IMRSS relay list, or other databases. However, except as described for the Active Filtering MTA 1113, the methods described by the present invention are compatible with but do not depend on the choice of MTA 1106 or the MTA's spam-filtering mechanisms.

Turning now to FIG. 8, the Active Filtering mechanisms are implemented as an SMTP proxy server process 1104 on a dedicated firewall host 1103, as is typical in a firewall architecture. The proxy server is identified as a Mail Exchange (MX) host in the DNS information for the local organization and has bound port 25 so that all connections to port 25 of host 1103 will be directed to the proxy server process of filter 1104.

Thus, when a remote host attempts to send mail to a user at the local network, the remote host gets the name of the proxy server from the MX record, translates the name into an IP address, acquires a socket, and opens a Transmission Control Protocol (TCP) connection to port 25 of the firewall host 1103, in accordance with standard socket programming practice. If the active probing of the remote host characterizes it as unlikely to be a source of spam, then the proxy server process 1104 opens a connection to port 25 of the mailhost 1105 (which has likewise been bound by the MTA 1106), transfers the initial protocol messages to the MTA 1106, and then transparently passes data to the MTA 1106.

With respect to FIG. 9, the same Active Filtering proxy 1104 runs as a process on the mail server host 1107. The proxy 1104 performs the same functions as it does when it runs on a separate firewall host (i.e., FIG. 8), except that it does not necessarily need to establish an SMTP connection to the MTA 1106. Instead the proxy server 1104 may use any available InterProcess Communications (IPC) method 1108 that is provided by the mail server host 1107.

Depending on the operating system, there are several alternatives for communicating with the MTA 1106. A first alternative, for instance, includes a TCP connection to some port other than TCP 25. Port 26 is used, although any other TCP port could be used. The router 1101 must then be configured to prevent packet communications directly to the selected port (e.g., 26).

A second alternative with Unix hosts running sendmail, is for the proxy 1104 to be configured to save the message into a file, and pass the file to sendmail using the sendmail command line interface. Still yet, in a third alternative with Unix hosts, the proxy 1104 could use a Unix domain socket, named pipe, or other mechanism that is supported by the local MTA 1106.

In FIG. 10, the Active Filtering technology may be included as part of a MTA wrapper program 1110, for example, the Trusted Information Systems (TIS) Firewall Toolkit (FWTK) sendmail wrapper smap program. The smap program is essentially an SMTP proxy, but its primary function is not to block junk mail but rather to protect the sendmail program from attacks (such as unauthorized use of the DEBUG option), from stack overflow attacks, and from other external attacks on sendmail. Thus, the purpose of a wrapper 1110 is to protect the MTA 1106, and Active Filtering is an ancillary function. Various IPC methods 1108 are possible, although the FWTK smap program uses the sendmail command line interface. There is no need to do any special packet filtering, since the interface to sendmail is not visible to remote hosts.

As shown in FIG. 11, the Active Filtering technology 1112 could be implemented as part of a standard MTA 1106, resulting in a special MTA 1113 with Active Filtering.

As shown in FIG. 12, the Active Filtering proxy 1104 (on firewall host 1103) can be chained with other proxy servers 1116 (on firewall hosts 1114) to perform other mail filtering functions. For example, various products, such as in accordance with U.S. Pat. No. 5,623,600, provide filtering of viruses and other malicious code. Preferably however, the Active Filtering proxy 1104 is the first host in the chain of proxies, that is, closest to the Internet, so it is best able to determine the essential characteristics of the remote host that is attempting to send email. The two filtering proxies 1104 and 1116 provide improved filtering by requiring each message to pass through both filters before it can be accessed at a client workstation.

Provided the Active Filtering proxy has full access to the remote host, other configurations are possible. For instance, the Active Filtering and content filtering proxy servers (as well as the MTA) may run on the same proxy host. In addition, invocation of the content filtering proxy may use a means such as the Content Vectoring Protocol (CVP), rather than by serially linking the two proxies. This architecture permits additional proxies to be added to the chain, for example, proxies having other spam detection mechanisms or other content filtering techniques.

With respect to FIGS. 8–12, there does not necessarily have to be a one-to-one relationship between the number of Active Filters and the number of MTAs within an organization. For example, in FIG. 8 based upon performance and loading considerations, there might be three firewall hosts 1103, each connected to the LAN 1102, each running an Active Filtering Proxy process 1104, each having its own unique IP address, and each being configured as a MX host within the organization's DNS database. All three proxy servers 1103 would connect to the MTA 1106 only when they have legitimate (non-dialup, non-relayed, non-forged) email to deliver. While the individual active filtering processes themselves involve additional time and computing resources, these offload the processing of junk mail in such a way as to reduce the overall load on the MTA 1105.

Within these various architectures, Active Filtering operates primarily as a server with respect to the initial connection from the remote host. SMTP is a client-server protocol, in which the remote host (client) issues requests to the local host (server). Although the remote host initiates the connection and each subsequent protocol exchange, transfer of the message is under control of Active Filtering proxy 1104, which may decide to reject a particular SMTP transaction or even disconnect from the remote host. The Active Filtering proxy 1104 (and its implementations in 1110 and 1112) provides for actively probing the remote host with a reverse SMTP connection to identify certain characteristics of the remote host that historically have a high correlation with sources of junk mail.

Operation

FIG. 13 provides an overview of the present invention, with more detailed operation shown in FIGS. 14–23. The figure shows the key steps used by the Active Filter Proxy 1401 to validate a single email message from a remote host 1400 and transfer the message to the protected MTA 1402. A separate SMTP connection 1418 is used for actively probing the remote host in order to perform Active Dialup 1420 detection and Active Relay 1450 detection. An additional connection may be established to a different mailhost for Active User testing. The Active Filter Proxy 1401 corresponds to proxy 1104 shown in FIG. 7.

The proxy 1401 is shown in FIG. 13 connected between the remote host 1400 and the local MTA 1402. The proxy 1401 and MTA 1402 may be located at separate hosts, as shown in FIGS. 8 and 12, or at a same host as shown in FIGS. 9–11. Because the proxy 1401 controls when it reads data on the connection 1403, it is not possible for the remote host 1400 to proceed with transfer of its message until the proxy 1401 completes its filtering. The proxy only handles incoming email and does not process outgoing email from the MTA to remote hosts. Outgoing email is sent directly from the MTA 1402 to the network.

With respect to Internet standards, the present invention may be implemented without any changes to SMTP or any other protocol. Rather, this method uses multiple SMTP connections, appropriately timed to permit the proxy server to characterize the remote host 1400. Thus, the SMTP connection 1403 is initiated by the remote host 1400, and involves transactions 1410, 1413, 1480, 1484, 1488, 1493, and 1495. The SMTP connection 1418 is initiated by the Active Filtering proxy 1401, and involves transactions beginning at step 1450. This session is used only to acquire protocol responses from the remote host 1400. It does not actually send an email message from the proxy server 1401 to the remote host 1400. In addition, the proxy server 1401 makes other connections to DNS name servers and, if the connection 1418 fails, may make an SMTP connection to the Mail Exchange (MX) host for the address given in step 1413.

Taken together, the processing performed by the Active Filtering proxy 1401 involves the following actions when a remote host 1400 establishes a TCP connection 1403 to the proxy. First, as shown at step 1406, the proxy server 1401 gets the IP address of the remote host and compares the IP address with a database of disallowed addresses. If the IP address of the remote host 1400 matches an entry in the database, the proxy server closes the TCP connection 1403 without transferring an email message. This is described in greater detail in FIG. 14.

At steps 1410 and 1413, the proxy server processes the HELO (optional) and MAIL messages from the remote host 1400. The MAIL message contains the address of the purported sender of the incoming message, which is commonly forged in junk email. Except for trusted addresses (e.g. trusted hosts or whitelisted addresses) and other reverse test connections 1418 (to prevent cycles of reverse test connections), the proxy attempts to open a reverse test connection 1418 to the remote server host. The response (or lack of response) from the remote host dictates the subsequent processing flow.

If the proxy cannot open the reverse connection, it may be because the remote host is a dialup workstation. Accordingly, the proxy then performs Active Dialup testing 1420. Internet service providers typically block service requests (such as SMTP) to their dialup customers using dynamic IP addresses (e.g., assigned by Dynamic Host Configuration Protocol, DHCP, which automatically assigns IP addresses to client stations logging onto a TCP/IP network). The proxy then uses certain heuristics based on the name of the host and its neighbors to categorize the host as a dialup or non-dialup. If it categorizes the host as a dialup, the proxy closes connections 1403 without transferring the email message. Otherwise, it performs Active User testing of the Mail Exchange (MX) host for the From address given in the MAIL message. Active Dialup is described more fully with respect to FIGS. 16–17.

If the reverse connection is successfully opened, then the proxy performs Active Relay 1450 testing. Under Active Relay testing 1450, once the reverse connection 1418 is opened, then the proxy 1401 sends HELO, MAIL From, and RCPT To messages to determine if the remote host would relay mail for the local proxy. If so, then it follows that the remote host is a high risk for relaying mail from other sources. If the reverse test messages 1450 indicate an open relay or the remote host rejects the MAIL From address 1413, the proxy preferably sends an error message and immediately closes the connection. Active Relay testing is discussed more fully with respect to FIG. 18.

If the results of the Active Dialup or Active Relay tests are negative (unable to open a reverse connection to the remote host) or indeterminate (unable to successfully conclude Relay testing on that connection), then the proxy 1401 conducts Active User testing 1901. Here the proxy identifies a mailhost responsible for processing mail to the supposed sender of the message and queries that mailhost as to whether it will accept mail to that address. These protocol interactions are similar to those used in the Active Relay method but are not shown on FIG. 13 since they do not usually involve the remote host 1400. If the configured mailhost for that address will not accept a reply to the MAIL From address, then the message is probably forged, so the proxy 1401 sends an error message and immediately closes the connection. Active User testing is more fully discussed in relation to FIG. 19.

If the proxy 1401 does not reject the MAIL From transaction 1413 following the Active Dialup, Active Relay and/or Active User testing, then in step 1470 the proxy opens a data connection to the MTA 1402. In step 1472, if a HELO message was received in step 1410, then the proxy sends it to the MTA. In step 1474, the proxy sends the MAIL From message (received in step 1413) to the MTA, and sends the MTA response back to the remote host. This is more fully described with respect to FIG. 20.

Once the proxy 1401 opens the connection 1470 to the MTA 1402, it transfers protocol messages (e.g., RCPT 1480, DATA 1484, message data (header 1488 and body 1493), and the dot and quit messages 1495) to the MTA as they are received. This occurs transparently with the exception of a conventional Bcc filter 1491 that scans lines of the message header for To: or Cc: lines containing a local domain name. If it does not find such a header line, as is commonly done in junk mail messages, the Bcc filter 1491 returns an error to the remote host and closes all connections. The proxy 1401 also transfers MTA 1402 protocol responses (e.g., 250, 550, not shown) transparently to the remote host 1400. This is described in greater detail in FIGS. 20 and 21.

When the message is transferred successfully, the MTA 1402 normally closes the connection to the proxy 1401, which in turn closes the connection to the remote host 1400. In single-threaded implementations, the proxy simply exits. In multi-threaded implementations, the proxy deallocates the resources (sockets, memory buffers, etc.) used for the message exchange and resets internal state variables to indicate that the message is no longer active.

FIGS. 14–23 detail the methods and apparatus of the Active Filtering methods shown in FIG. 13. These diagrams use a combination of the protocol message format favored in protocol documentation, and logic diagrams for the Active Filter proxy itself as is commonly used in software documentation.

There are three primary participants throughout the protocol descriptions, namely Remote Host 1400, Active Filter Proxy 1401 and Local MTA 1402. Remote Host 1400, shown at the left in the figures, is the host that is attempting to send mail to the local domain. This host may be a sending MTA, a telnet session from a user shell account on the remote host, or a SMTP direct session from a user workstation. Active Filter Proxy 1401 is located between the Remote Host 1400 and Local MTA 1402, and is shown in the middle of the figures. Local MTA 1402 is shown at the right in the figures. The flow of mail from a legitimate host to the local protected MTA is shown in the figures as flowing from left to right. The system further interacts with DNS name servers, as well as the Sender's configured mailhost (FIG. 19).

Referring back momentarily to FIGS. 8–12, the Active Filtering design may be implemented in various forms. FIGS. 13–21 apply to an Active Filter proxy server process that may or may not be located on the same host as the local MTA process 1402. The system is applicable to each embodiment of FIGS. 8–12 since the proxy 1401 and the MTA 1402 are assumed to interact via some form of Inter Process Communications (IPC) or intra-process communications for which the details of this IPC are irrelevant. In accordance with the preferred embodiment, the proxy runs on a separate host that is part of a firewall (FIG. 8). However, the proxy may run as two processes on the same host, using a TCP connection between the two processes.

In all cases, the proxy host 1401 is preferably a Mail Exchange (MX) host for the local domain and is configured to listen on the SMTP port (TCP 25) for connections from remote hosts 1400. In the preferred embodiment, the proxy runs on a Unix system and the Unix inetd (Internet Daemon) program (not shown) is configured (via the /etc/inetd.conf file) to start a separate instance of the Active Filtering process when it receives the TCP connection to port 25. Thus, the proxy process 1401 handles a single message and exits when it has either rejected the message or transferred the message to the MTA.

Connect-Time IP Address Filtering

Operation of the filter proxy 1401 will now be described with reference to FIG. 14, which is after the proxy 1401 receives a connection 1403 from the remote host 1400. Starting at step 1404, the proxy 1401 gets the remote host's IP address and hostname from the Domain Name System (DNS). This is typically performed by calling the getpeername( ) function to get the 32-bit IP address of the connecting host and then converting it to a dotted-quad format (e.g.,192.168.200.201).

The proxy then calls gethostbyaddr( ) to get the remote hostname (e.g., "smtp.remote.dom") from the IP address and calls gethostbyname( ) to verify the consistency of DNS information about the remote host. Properly configured hosts have a DNS Pointer (PTR) record that maps the IP address to a host name, and an Address (A) record that maps the name to the corresponding IP address. At the end of this step, the proxy has both the IP address and name (if defined in DNS), as well as an indicator as to the consistency of this information.

At this stage, the proxy only acquires naming information about the remote host. It does not, at this point, decide to reject the message. In keeping with the general theme that most of the spam problem is because of misconfigured systems (misconfigured open relays, and the failure of ISPs to use their own packet routers to stop outgoing SMTP from their dialups), there are also many misconfigured name servers. So it is possible the proxy could get a connection from any servers in Table 1.

TABLE 1

| Connecting Host | host name from gethostbyaddr() | valid address from gethostbyname() | |
|---|---|---|---|
| 192.168.200.200 | abc.remote.dom | 192.168.200.200 | consistent info |
| 192.168.200.201 | smtp.remote.dom | 192.168.200.99 | inconsistent info |
| 192.168.200.202 | unavailable | n/a | incomplete info |

At step 1405, the proxy determines if the remote host is categorized as trusted. Trusted networks are usually defined manually by using a suitable editor to enter IP addresses of trusted networks into the trusted database 1093 (FIG. 7). The proxy looks up the host name or IP address in a database of trusted network names and IP address blocks. This database is preferably a single linear file. A host name, e.g., "host37.remote.dom" matches an entry "remote.dom" if the two strings match from the last byte forward, for the length of the shorter string. If the host is trusted, processing continues with display of the greeting message in step 1409.

If the host is not trusted, the system proceeds to step 1406, which is also shown in FIG. 13. Here, the proxy determines whether the remote network has been blacklisted. The proxy compares the IP address of the remote host 1400 with entries in the blacklist database. Preferably, the blacklist database is implemented as a linear file containing one filter per line. Each filter consists of an ASCII dotted-quad address followed by a forward slash "/" and the number of bits to be compared, for example, "192.168.200.201/24", with optional textual information such as the date the filter was created, the host name, and the reason. The proxy compares the remote host's IP address with a filter entry by converting the two IP addresses to 32-bit values, XORs the two values, and right shifts the result so that only the specified number of bits (e.g., 24) remain. If the result is zero, then the remote host 1400 matches that particular filter.

At step 1408, if the remote host is blacklisted, the proxy 1401 issues an error reply to the remote host (e.g., "550 SMTP administratively blocked"), closes the connection 1403, logs the rejected connection, and exits without any email being transferred. The system log 1099 (FIG. 7) may be configured to log on the local host or on a remote host, such as the local MTA 1402. If the remote host 1400 is trusted or the IP address acquired in 1404 does not match any entry in the blacklist 1406, then the Active Filter displays the SMTP greeting message, step 1409.

Processing continues as shown in FIG. 15 when the remote host sends data on the open connection 1403. At this point, the proxy has not established a connection to the local MTA 1402. The proxy connects to the server (FIG. 20) only after validating the MAIL From message.

The use of linear files for the trusted database and the blacklist database might not be optimal for performance in all networks. Accordingly, trusted domain names (e.g., "remote.dom") might preferably be maintained in a hashed list or dbm file. Blacklisted IP addresses might preferably be maintained in bitmap, a hashed list, dbm file, or even in Content Addressable Memory (CAM) for increased performance. The check for a blacklisted IP address consists of opening the bitmap database, seeking to the appropriate byte, and reading the bit for the specified block (e.g., 192.135.140) of IP addresses. If the bit is set, then the block of addresses is blacklisted, otherwise it is acceptable.

Blacklisted IP addresses are appended automatically to the blacklist database by various sensors in subsequent filters (i.e., the Active Dialup, Active Relay and Active User Filters), subject to a configuration setting. This permits the Active Filter proxy to react quickly to floods of spam from a particular host. However, if the sensor makes a bad decision, then the incorrect filter must be manually removed by editing the file.

MAIL Message Processing

At FIG. 15, the remote host 1400 may send an optional HELO message 1410. In this event, the proxy 1401 simply reads the message in step 1411, potentially logs the message, and sends a response 1412 to the remote host. This message is irrelevant with respect to junk mail filtering, since no access decisions are made on the contents of the HELO message.

At step 1413, the remote host 1400 sends a mandatory MAIL From message to the proxy 1401. At step 1414, the proxy reads the message from the TCP connection. The message must contain an email address, represented as "<mfaddr>", in the Internet address format consisting of the concatenation of a user name, "@" sign, and domain name. The term "MAIL From address" refers to the entire address passed in the MAIL From message, and the term "MAIL From domain" refers to the domain name to the right of the "@" sign.

At step 1415, the proxy checks the MAIL From address to determine if the remote connection is from another Active Filtering proxy 1401. For instance, suppose host A and host B both have an Active Filtering proxy handling incoming email connections. Host A opens a data connection to host B. In turn, host B opens a reverse test connection back to host A. When this happens, host A must recognize the reverse test connection so that it does not propagate a cycle where each proxy opens reverse test connections to the other, until either the initial connection is terminated or one of the proxies runs out of resources.

This can be handled in various ways, such as using a reserved MAIL From address, (e.g. "relaytest@hostb.somenet.dom") to explicitly indicate that this is a relay test. Alternatively, an Extended SMTP (ESMTP) command such as "XREVTEST" may be sent by host B to indicate that the connection is a reverse test connection.

In accordance with the preferred embodiment of the invention, the Active Filtering proxy uses the reserved address "reverse" with the local domain name on each reverse test connection. This reserved address is used by all Active Filtering proxies. Continuing with step 1415, the proxy 1401 checks the MAIL From address to determine if it contains the reserved name "reverse" before the @ symbol. If so, the proxy issues an error reply 1416 on the incoming connection and exits. The receiving proxy then closes the connection when it detects this address to prevent abuse by spammers who might learn this reserved address. In this case, the remote host (e.g., the proxy at host B) will not be able to test the local host (e.g., host A), but email will still be possible.

At step 1417, the proxy filter 1401 skips subsequent checking of the MAIL From argument if either the connecting hostname or the MAIL From domain matches a trusted database entry, using the same method as in step 1405. The trusted database identifies networks with which there are long-term trust relationships, so that any user from one of these domains can send mail without restriction. If the domain is trusted, step 1417, processing continues with step 1470. Also at step 1417, the filter skips subsequent checking of the MAIL From argument if the MAIL From address (user@domain) exactly matches an entry in the whitelist database.

In the preferred embodiment, the whitelist file is a text file that contains addresses (one per line) that are periodically mined from sendmail log entries for outgoing ("to=") messages. These log entries are for mail sent by the local organization to destination addresses on other networks, so adding these destination addresses to the whitelist file will ensure that the proxy will permit incoming email from those persons that local users have sent mail to. However, the whitelist database may be implemented as a hashed database (e.g., dbm) files, or even could be disabled. If the address matches a whitelist entry, processing continues with step 1470. The difference between the trusted database 1093 and the whitelist database 1094 is that for trusted hosts, mail is permitted from any user on the remote host to any user on the local host. For whitelist entries, mail is permitted only from the named user on the remote host to any user on the local host.

If the incoming connection is not itself a relay test and the message does not match any of the trust criteria, then in step 1418, the proxy 1401 attempts to open the reverse test connection to the remote host 1400. This is typically performed by calling socket( ) to acquire a socket structure to manage the connection to port 25 of the remote IP address 1400, then calling connect( ) to request the networking software to establish a TCP connection using the socket.

In step 1419, the proxy 1401 checks the status of the connect( ) call. TCP networking implementations by convention return a status of zero if the connection is successful, otherwise TCP returns −1 and sets an error number to indicate the specific error. If the reverse connection is successful, then the proxy continues with step 1450 to perform Active Relay testing (FIG. 18).

However, if the reverse connection fails, then the proxy continues with Active Dialup testing in step 1420 (FIG. 16). In this case, the connection must have been blocked by the remote network (the remote host 1400 cannot be offline since it has just connected to the proxy server). In most cases the connection will be actively refused by the remote host 1400 (or its packet routers). This will result in an error of ECONNREFUSED 61. In a few cases, the remote network may silently block the TCP open request to the remote host 1400, without giving an error response. In this case, the local networking software will return ETIMEDOUT 60 as the network error.

Active Dialup Categorization

As noted above, email from dialup PCs running direct SMTP programs is a major problem since the spammer can use the program to forge any protocol field or message header field. Approximately one-third of the junk mail attempts are from ISP dialup addresses. The spammer almost always uses a relatively inexpensive "throwaway" dialup account with an Internet service provider (ISP). These dialup accounts typically have certain characteristics imposed by their respective ISPs. Because of the use of dynamic name allocation (e.g., DHCP) and because of pricing strategies, the ISP permits the user to only operate as a client. That is, the ISP uses its packet routers to block network service requests such as SMTP to their dialup users. The second characteristic of dialup accounts is that most ISPs use a regular naming scheme for such dialup addresses so as to simplify maintenance of the DNS database. The names frequently include decimal or hexadecimal representations of the last byte of the IP address.

In FIG. 16, the proxy 1401 continues with Active Dialup detection at step 1420 after determining at step 1419 that it cannot establish a reverse test connection to the remote host 1400. This method is performed only for untrusted hosts, since the reverse connection is not attempted for trusted hosts, step 1417.

At step 1421, the proxy 1401 attempts to determine if the IP address or domain name matches a non-dialup entry in the dialup database. The Dialup configuration database 1097 (FIG. 7) lists blocks of non-dialup addresses that otherwise meet the criteria for dialup (i.e., will not accept a reverse connection and have a sequential naming scheme) but that are known to not be dialups. For example, an ISP may have sequentially-named mailhosts with some mailhosts dedicated for outgoing mail and some mailhosts dedicated for incoming mail.

To continue with step 1421, there will typically be only a few entries in this database because most non-dialups are characterized correctly by the Active Dialup method. The remaining entries are common across the Internet and can be pre-defined and installed along with the proxy server. It may be necessary to add an entry to this database whenever any ISP installs or renames a block of mailhosts that appear much like dialups, but this too can be centrally distributed. It is preferable to list these few address blocks than to attempt to identify all possible dialup addresses.

The addresses in step 1421 are preferably expressed as a dotted-quad IP address, a slash "/", and a number of bits to be matched. For example, the filter 192.168.200.201/24 matches all addresses between 192.168.200.0 and 192.168.200.255. An address matches a particular filter if the filter address 1097 (FIG. 7) and the remote host 1400 IP address match for the specified number of bits. For example, the IP address 192.168.200.29 matches the filter 192.168.200.201/24 because the two addresses are identical for the first 24 bits, i.e., 192.168.200.

The preferred embodiment uses a flat ASCII file structure for the dialup database. If the requirement for non-dialup entries grow significantly, other representations (hashed lists, dbm files, or CAM) may be desirable for performance reasons. If the IP address matches any entry, then the proxy 1401 bypasses any further dialup testing, and proceeds to step 1901. Relay testing is not conducted since the filter has already determined that the reverse connection cannot be established to the remote host at step 1419. If it does not match any entry in the non-dialup list, then it proceeds with dialup testing in step 1422.

At steps 1422–1424, the proxy 1401 compares the name of the connecting host with its immediate neighbors, using a heuristic approach to correlate a sequence of names as dialups or non-dialups. In the preferred embodiment, a threshold total of ten match points are required to classify a remote host as a dialup. This approach takes into account the remote host name, character sequences in the name, and sequential nature of host names near the IP address of the remote host 1400.

At step 1422, the filter scans the node name of the remote host 1400 for certain sequences and adds or subtracts points. The node name is the part of the host name up to the first period. For example, the node name for "dial-37.remote.dom" is "dial-37". The preferred embodiment obtains this information from an entry in the dialup configuration database 1097 (FIG. 7), which contains text strings and associated points, separated by a slash "/", as listed in Table 2.

TABLE 2

| dial/5 | ppp/5 | slip/5 |
|--------|-------|--------|
| dhcp/5 | smtp/−5 | mail/−5 |

In the preferred embodiment of Table 2, five points are assigned if the node name contains "dial", "ppp" (for Point-to-Point protocol), "slip" (for Single Line IP), or "dhcp" (for Dynamic Host Configuration Protocol). Five points are subtracted if the node name contains "smtp" (indicating a SMTP host) or "mail" (indicating a mailhost). Of course, other sequences and point values may also be used. The above configuration data can be extended to include other sequences that may subsequently be associated with dialup hosts.

Not all remote hosts have a consistent name and IP address assigned in DNS, as described for step 1404. That is, a call to gethostbyaddr( ) or gethostbyname( ) will fail, or the returned information is not consistent. The Dialup DB 1097 has a Reject-unknown-dial option to either reject the connection with an error message indicating a DNS naming error or continue processing, thus relying on other filter layers to catch the problem.

At step 1423, the proxy 1401 compares the node name of the remote host 1400 with its neighbors and assigns additional points if the names appear to follow a sequential naming scheme. Further to the preferred embodiment, the proxy compares names of neighbor hosts by performing the following actions for all IP addresses that are within the range nnn−10 to nm+10, where nnn is the node address (last byte of IP address) of the remote host 1400. Details of step 1423 are provided in FIG. 17. For example, the following Table 3 for a remote host 1Cust117.tnt5.salt-lake-city.ut.da.uu.net at IP address 63.11.217.117, shows the IP addresses and node names for its 20 nearest neighbors.

TABLE 3

Neighboring IP Addresses for Remote Host 63.11.217.117

| Offset | IP Address | Node Name |
|--------|------------|-----------|
| −10 | 63.11.217.107 | 1cust107 |
| −9 | 63.11.217.108 | 1cust108 |
| −8 | 63.11.217.109 | 1cust109 |
| −7 | 63.11.217.110 | 1cust110 |
| −6 | 63.11.217.111 | 1cust111 |
| −5 | 63.11.217.112 | 1cust112 |
| −4 | 63.11.217.113 | 1cust113 |
| −3 | 63.11.217.114 | 1cust114 |
| −2 | 63.11.217.115 | 1cust115 |
| −1 | 63.11.217.116 | 1cust116 |
| 0 | 63.11.217.117 | 1cust117 |
| 1 | 63.11.217.118 | 1cust118 |
| 2 | 63.11.217.119 | 1cust119 |
| 3 | 63.11.217.120 | 1cust120 |
| 4 | 63.11.217.121 | 1cust121 |
| 5 | 63.11.217.122 | 1cust122 |
| 6 | 63.11.217.123 | 1cust123 |
| 7 | 63.11.217.124 | 1cust124 |
| 8 | 63.11.217.125 | 1cust125 |
| 9 | 63.11.217:126 | 1cust126 |
| 10 | 63.11.217.127 | 1cust127 |

This example shows how this particular ISP sequentially named its hosts over the range to be considered (and, indeed, throughout the entire block of addresses). In this case the last byte of the IP address is identified directly in the node name, but this is not necessary for this approach to work.

At step 1424, the proxy 1401 compares the total current number of match points from steps 1422 and 1423 with the threshold number of points (10, in the preferred embodiment) required to characterize the remote host as a dialup. If the number of match points exceeds the threshold, then it exits, step 1425. Otherwise, message transfer continues with step 1901.

At step 1425, the proxy 1401 issues an SMTP error message (e.g., "550 apparent dialup") and exits, thus closing the data connection without any email being transferred. In the preferred embodiment, the proxy also logs the rejected dialup and adds the IP address of the remote host to the blacklist database.

FIG. 17 shows further detail of the processing flow for step 1423 in accordance with the preferred embodiment. Step 1500 calculates a 32-bit IP address for the remote host, which is used in step 1504 to calculate the IP address of one of its 20 neighbors. Steps 1501, 1502, and 1503 perform the remaining steps shown in the figure for x=−10 to x32 +10, inclusive, while skipping the remote host at x=0. When the loop is finished, the proxy exits to step 1424 of FIG. 16, which classifies the remote host as a dialup or non-dialup based on the accumulated number of match points.

Step 1505 limits the name comparison to the 8-bit (Class C) address block that contains the remote host to avoid comparing a remote host name in one ISP with neighbors in a block operated by a different ISP. It XORs the 32-bit IP address for the neighbor x and the IP address for the remote host and shifts the result right 8 bits. If the result is non-zero, then the neighbor x is in a different address block than the remote host, and is skipped. Thus, the range is absolutely bounded by a minimum node address of 0 and a maximum node address of 255, so that the comparison for remote host 192.168.200.2 would only consider node addresses from 0–1 and 3–12, in order to avoid comparing names in other 8-bit blocks of addresses.

At a minimum, ten addresses will always be considered. Preferably, 10 names are matched out of 20 (n−10 to n+10) so that if the remote host is at the beginning of a block, e.g., 192.135.140.0, then there will still be ten opportunities to match from 1 to 10, and if the remote host is at the end of a block (e.g., 192.135.140.255, there will still be ten opportunities to match in the range 245 to 254.

Steps 1506 and 1507 call gethostbyaddr() to get the host structure for the neighbor x, which contains the host name. Errors do not terminate the comparison, since there may be gaps in the DNS information near the remote host. Steps 1509 and 1510 compare the respective lengths of the remote host name and its neighbor x. If either is more than one character longer than the other, then skip the neighbor x because the two names do not appear to be part of a sequence.

Step 1511 scans forward and backwards to identify the sequence of non-matching characters in the names of the remote host and its neighbor x. This sequence may contain substrings of matching characters, but as shown in step 1512, if either string is greater than three characters in length, then skip the neighbor x because the two names do not appear to be part of a sequence.

Step 1513 scans the two strings from the names of the remote host and the neighbor x to determine if either contains a hexadecimal-only digit, i.e., a character in the range a–f. If so, it sets the hexmode flag. In step 1514–1516, the proxy 1401 checks the hexmode flag and converts the string for the host x to a hexadecimal or decimal value, based upon the setting of the hexmode flag.

In step 1517–1519, the proxy calculates the absolute distance between the two name sequences. If the distance is less than or equal to the absolute value of x, then the names appear to be part of a sequence and the match counter is incremented. For example, Table 4 shows the distance as correlated to the offset x for the four nearest neighbors of the remote host 63.11.217.117, based on the information in Table 3. As shown in this example, the distance calculated for each of the four nearest neighbors is identically equal to the difference in IP address values, thus the names are part of a sequence.

TABLE 4

Distnce for IP Address
Neighboring Remote Host 63.11.217.117

| IP Offset (x) | IP Address | Node Name | Distance |
| --- | --- | --- | --- |
| −2 | 63.11.217.115 | 1cust115 | 2 |
| −1 | 63.11.217.116 | 1cust116 | 1 |
| 0 | 63.11.217.117 | 1cust117 | skipped |
| 1 | 63.11.217.118 | 1cust118 | 1 |
| 2 | 63.11.217.119 | 1cust119 | 2 |

The preferred embodiment detailed in FIG. 17 provides categorization of a dialup host based upon a linear correlation of its neighbors' host names. It does not require each host name to directly encode its IP address (as shown above), but also permits other linear relationships. It correctly handles address blocks that have one or more legitimate mailhosts, usually at the beginning of the block, but use the rest of the block for dialup addresses. It permits discontinuities in the name space, provided the remote host is part of a name sequence that is sufficiently long. It correctly handles node addresses at the top (e.g., 255) and bottom (e.g., 0) of a Class C block of addresses, where name discontinuities are most likely to occur. It also permits fixed-width names (e.g., "001" through "255") and variable-width names (e.g., "1" through "255"). And, as indicated in FIG. 16, it permits either decimal or hexadecimal encodings.

The preferred embodiment supplements these Active Dialup methods with the blacklist filter 1406 (FIG. 14). Bulk mailers who use the SMTP direct mechanism will typically retry from different (dynamically assigned) IP addresses, but frequently from addresses in the same Class C (8-bit) address range. By adding the IP address to the blacklist database, nominally with the number of bits to be matched set to 24, the mechanism takes advantage of the relative speed of a blacklist database lookup as compared with subsequent iterations of the above active dialup mechanism. The filter can be left perpetually in the blacklist database, or preferably removed from the blacklist database if it is not used in some number of days or weeks. Further, filters can be manually added to handle any blocks of dialup addresses that are not identified by the Active Dialup method.

The preferred embodiment provides for Active Dialup detection following reception of the MAIL From message on connection 1403. This permits logging of the MAIL From address and also prevents continuous cycles of reverse test connections since Active Dialup detection occurs after the reverse connection test in step 1415.

However, in an alternate embodiment a proxy might perform Active Dialup detection immediately after the proxy receives a connection 1403 from the remote host 1400. To prevent continuous cycles of reverse test connections, the proxy would then preferably perform name categorization in steps 1422, 1423, and 1424 before attempting to open a reverse test connection. Further, if the test connection is opened successfully, the proxy must then immediately close the connection, thus causing a remote Active Filtering proxy to exit before it can open a reverse test connection back to the current proxy.

The preferred embodiment shown in FIG. 17 depends upon administrators of remote networks continuing to use logical sequences when they assign names to their dialup addresses. Such sequential names are easiest to define and maintain, so it is in the interest of these administrators to use a sequential naming scheme. However, ISPs might also assign irregular names or name lengths to their node addresses. The only conceivable reason for making such assignments would be to permit their users to avoid Active Dialup detection, so such addresses can be manually added to the blacklist database if they are not appended by subsequent Active User filtering.

The following alternative embodiments are more flexible with respect to detecting such irregular naming sequences, but have other side effects as noted. These embodiments could be used in step 1423 in place of, or in conjunction with, the preferred embodiment shown in FIG. 17.

In accordance with the alternative embodiment shown in FIG. 22, the proxy can categorize a remote host as dialup or non-dialup based on the edit distance between the remote host's name and its neighbors' names. For example, a change of a "3" to a "7" involves an edit distance of one, as does insertion of a character, or deletion of a character. In conjunction with its failure to establish a reverse test connection 1418, a proxy can conclude that a low edit distance is evidence that the remote host name is part of a set of closely-related names consistent with a dialup name space. This method could be used to replace the method shown in FIG. 17 (and referenced in FIG. 16 step 1423) where names are closely-related, but not necessarily sequential. With respect to FIG. 22, steps 1500–1520 are as described in FIG. 17 and provide a method of acquiring the neighboring host names for the remote host 1400. In step 1530, the proxy accesses the Dialup DB 1097 to acquire the threshold value to be used in the remaining steps.

Possible threshold values are 1, 2, and 3, since an edit distance of 0 would indicate identity and thus not be useful and an edit distance greater than 3 is too broad and would result in miscategorization of non-dialup hosts as dialups. An edit distance of 1 would indicate a high degree of correlation (names would match only if they differed by one character), but would fail to match names such as "dial39" and "dial40". A threshold of 2 is probably optimal, even though it would improperly categorize rollover situations such as "dial99" to "dial100". A threshold of 3 would address the aforementioned rollover problem, but would miscategorize, for example, a remote host "mail" surrounded by a sufficient number of hosts with names such as "main", "mail2", and "menu". In step 1531, the proxy scans each character of the neighbor name and compares it with the corresponding character in the remote host name. If the two characters are identical (step 1532), then the proxy advances the character pointer in the two names. In steps 1533, 1534, and 1535, the proxy determines if a character must be replaced, inserted, or deleted to make the neighbor name consistent with the remote host name. If so, it increments the edit distance 1536 for the neighbor name and continues. When the comparison is complete, the proxy then checks if the accumulated edit distance is less then or equal to the threshold read from the Dialup DB in step 1530. If so, it increments the match count 1538. The proxy then continues with the next name, as determined by step 1502.

In another alternative embodiment, the host may be categorized as either dialup or non-dialup based on a correlation value between names and IP addresses. The correlation of a set of (x, y) values is a classic statistical problem. A low value (0.0) indicates no correlation, while a value approaching 1.0 indicates a high correlation. The x value in this case would be the node IP address (e.g., 107, 108, 109, etc.) and the y value would be some numeric representation of the host name (e.g., 1Cust107, 1Cust108, 1Cust109, etc.). In this example, the correlation would be exactly 1.0 because the names are assigned sequentially, but a lower correlation might still be evidence of a dialup address.

Still another alternative embodiment involves categorizing the remote host based on the ability to establish reverse test connections to its neighbors as well as the remote host itself, step 1418 (FIG. 15). If a sufficient number of neighboring addresses also do not permit reverse test connections, then it is reasonable to conclude that the remote host is a dialup. This method might be used by itself to replace the method shown in FIG. 17, or may be combined with the method in FIG. 17. With respect to FIG. 23, the steps 1500–1520 are as described in FIG. 17 and provide a means of stepping through each of the 20 nearest IP addresses for the remote host. In step 1550, the proxy attempts to connect to the neighbor x, using the same means described in step 1418. It checks the status for the connection in step 1551. If the connection is not successful 1552, as would be typical for a block of dialup addresses, the proxy increments the match count. However, if the proxy is able to establish a reverse connection to the neighbor x, it subtracts 2 from the match count 1553 and closes the test connection 1554. This weighting permits as many as three neighbors to accept reverse connections and still categorize the remote host as a dialup. The proxy then continues with the next name, as determined by step 1502. The disadvantage of this approach is that it may be time-consuming to attempt a large number of reverse SMTP connections. However, it is less time consuming to perform this test in SMTP filtering software than it is to deal with the spam or junk mail after it is received on the organization's mail server.

As described above, various conventional systems maintain static databases that list blocks of dialup addresses. However, the problem with these lists is that they are static (not dynamic). Consequently, a new block of addresses can be abused by dialup PCs numerous times before it goes on one of these lists. Further, if such a block of addresses is blockaded, and subsequently reused for a legitimate mailserver, then legitimate mail will be rejected because of the history of that IP address.

An advantage of the Active Dialup filter of the present invention is that it is dynamic, and so categorizes the remote host at connection time based on non-response to a reverse SMTP connection and certain characteristics of the names of the remote host and its neighbors.

Active Relay Testing

In FIG. 18, the proxy 1401 continues with Active Relay testing at step 1450 after successfully opening a reverse test connection to the remote host (step 1419, FIG. 15). Active Relay testing is performed only for non-trusted hosts (as determined in step 1417) and if the reverse connection 1418 was successfully established. The Active Relay test characterizes the remote host with respect to its perceived acceptance of a reply to the supposed sender and whether the remote host is likely to be an open relay.

The proxy 1401 performs Active Relay Testing by testing the validity of the MAIL From address on the reverse connection and implementing a relay test, such as the one shown in FIG. 5. These tests are conducted while the remote host 1400 is connected to the proxy 1401 as a factor in determining whether to accept the remote host's message. If the remote host 1400 gives an indication that it will not accept a reply email message to the purported sender or that it will relay a test message from the proxy 1401, then that remote host is at an increased risk for relaying mail from someone else to the local MTA 1402. On the other hand, if the remote host indicates that it will accept a reply message for the sender and that it will not relay for the proxy, then the remote host probably is not an open relay.

The proxy 1401 performs this test using the reverse SMTP connection 1418, then continues with the protocol transactions in steps 1454, 1456, 1458 and 1465. The test simply monitors the responses from the remote host, and does not actually send an email message to the remote host 1400. The local MTA 1402 is not involved in this test.

At steps 1453–1467, the proxy server 1401 performs the active relay test. Steps 1453 through 1458 are preliminary steps required to progress to the relay test, while steps 1460 and 1467 provide the answers to the relay test. In step 1453, the proxy server 1401 reads the remote host's greeting 1452 from the open connection 1418. As indicated in item 1011 in FIG. 2, when an MTA receives a connection to its SMTP port, it writes its system greeting to the connection to indicate that it is ready to receive mail. The proxy reads and discards each line of the greeting, handling multi-line greetings as described for FIG. 2, since the greeting does not contain any useful information. If any read fails or if the first three characters of the greeting are not "220", the proxy exits from the relay testing sequence and continues with Active User testing of the supposed sender's mailhost in step 1901.

In step 1454, if the greeting is received without errors, the proxy sends a HELO message to the remote host. The text of the message is a configurable string (read from the configuration database 1098, FIG. 7), defined when the proxy is installed, and typically identifies the local host name. It should be noted that the HELO exchange is optional in most cases. However, some hosts require a HELO, which is therefore preferably included in the relay test.

In step 1455, the remote host 1400 sends its reply to the HELO message. In step 1456, the proxy 1401 reads the HELO response sent in step 1455. If the read fails or if the first three characters of the greeting are not "250", the proxy exits from the relay testing sequence and continues with Active User testing of the sender's mailhost, step 1901.

If the HELO reply is received without errors at step 1456, then the proxy issues a MAIL From message to the remote host. As noted above, the preferred embodiment uses the reserved name "reverse" to notify another Active Filtering proxy that this is a reverse test connection so that the remote proxy can avoid a connection loop. The address should identify the local domain name (for legal reasons). Thus, the message appears as MAIL From: <reverse@local.dom>.

The remote host 1400 will then respond as shown in step 1457, typically with a "250" response (to indicate acceptance) or a "550" response (to indicate non-acceptance). As shown in step 1458, if the remote host 1400 replies with anything other than a "250" response, or does not respond, the proxy exits from the relay testing sequence and continues with Active User testing of the sender's mailhost, step 1901.

If the remote host 1400 accepts the proxy's MAIL From message on the reverse connection 1418, then the proxy 1401 issues a RCPT message 1458 to the remote host on the reverse test connection. The proxy gives the complete MAIL From address of the supposed sender of the message ("mfaddr") as received previously in steps 1413 and 1414. This is equivalent to doing a real-time reply to the sender of the message, except that no data is transferred.

In steps 1458 and 1460 the proxy determines if the remote host will accept the address of the supposed sender of the message. This may appear to be designed to determine the actual existence of the user "mfaddr" as is performed by the Active User test at step 1901 and there is some overlap if "mfaddr" actually exists at the remote host 1401. However, in the general case, this step is designed to determine if the remote host is configured to deliver (either locally or by relaying) email to the supposed sender. If at step 1460 the reply is "250" then the remote host will accept mail to this address, so the proxy continues with step 1462. Otherwise, if the reply is anything other than "250", the proxy sends an error response 1461 on the data connection 1403 and exits, thus closing the data connection 1403 and the reverse connection 1418. In the preferred embodiment, the proxy also writes a system log entry for the rejected message and adds the remote host's IP address to the blacklist database 1095 (FIG. 7) before exiting.

For example, smallhost.dom may be a customer of big-isp.dom and uses the "smart host" smtp.bigisp.dom to handle its mail forwarding and to receive mail when it is not online. Thus, if smtp.bigisp.dom connects with MAIL From: <someone@smallhost.dom> and accepts a reverse test connection, then smtp.bigisp.dom should accept the proxy's RCPT To: <someone@smallhost.dom> message on the reverse test connection. However, if smtp.bigisp.dom connects with MAIL From: <getrichquick@bulkmail.dom> and accepts a reverse test connection, but will not accept a reply to the MAIL From address, this is evidence that the message is forged. It should be noted that this is only for the situation where the remote host will accept a reverse test connection. If the network will not accept a reverse test connection because it has separate incoming and outgoing mail servers, then processing will follow the Active Dialup 1420 path as shown in FIG. 15.

At step 1462, the proxy 1401 attempts to find if the IP address of the remote host 1400 matches a non-relay entry in the Relay database 1096 (FIG. 7). This database lists blocks of addresses that the local organization must exchange email with, but which would fail the relay test. There might typically be between about 5–50 entries in this database, with each entry covering a block of addresses. These entries can be pre-defined by a site survey performed by each organization, preferably before installing the Active Filtering proxy server. For simplicity, the preferred embodiment of the Relay Database 1096 (as with other IP addresses listed in steps 1406 and 1413) expresses these addresses as a dotted-quad IP address, a forward slash "/", and a number of bits to be matched. Other embodiments may use other representations (hashed lists, dbm filed, or CAM) for performance reasons.

If the IP address matches any non-relay entry, then the proxy 1401 bypasses any further relay and user testing, and proceeds with message transfer in step 1470. If the IP address of the remote host does not match any entry in the non-relay list, then it continues with the second part of Active Relay testing at step 1463. Before performing the relay test, the proxy compares the MAIL From domain with the connecting host name. A match at step 1463 occurs when the connecting host name and the MAIL From domain are identical, beginning at the end of the two strings, and comparing backwards over the last two nodes (i.e., periods) of the two domains. For example, if host "smtp.gamma.dom" connects with MAIL From "alpha@gamma.dom", the two domains match over the scope "gamma.dom". However, if host "smtp.gamma.dom" connects with MAIL From "alpha@beta.dom", the two domains do not match.

If the two domains match in step 1463, the proxy checks the Relay database 1096 at step 1464 to determine if an administrator has configured the proxy to perform loose relay testing. With loose testing, the proxy permits mail from open relays if the MAIL From address matches the connecting host name. In this case, the relay test message 1465 is not necessary, so the proxy continues with transfer of the message in step 1470.

If either of the domains do not match in step 1463 or the Relay database is configured for strict relay testing, the proxy issues a RCPT message 1465 identifying a configurable string, defined when the proxy is installed. The default includes the name "relayto" and the local domain name (for legal reasons), for example, RCPT To: <relayto@local.dom>. The configurable recipient address may be any syntactically correct address. Even though a message is not sent the RCPT address is preferably not a real user address in order to avoid address mining by spam site administrators.

The remote host 1400 will then respond as shown in step 1466, typically with a "250" response (to indicate that it is willing to relay) or "550" (to indicate that it will not relay). In step 1467, the proxy 1401 determines the status of the reply message from the remote host.

If the reply is "250", then the remote host will apparently relay for the proxy, so the proxy rejects the message as indicated in step 1468 and exits, thus closing all connections. In the preferred embodiment, the proxy also writes a system log entry for the rejected message and appends the IP address to the blacklist database (FIG. 7, item 1095). If the reply to the RCPT message 1462 is anything other than "250", then this indicates that the remote host is not an open relay, and so the proxy continues with reception of the message at step 1470.

Thus, the proxy sends two RCPT messages (1458 and 1465) to the remote host. The remote host must respond with a "250" to message 1458 and with anything other than "250" to message 1465. This establishes that the remote host is responsible for the MAIL From address received in step 1414 but is not an open relay that will accept any RCPT address. Other combinations are described in the following paragraphs.

If the proxy responds with a "250" to both RCPT messages, then it is not possible to tell if the MAIL From address 1413 is legitimate or not. In the previous example, a legitimate message from <someone@smallhost.dom> may be sent via an open relay smarthost smtp.bigisp.dom. Alternately, the message could well be forged, since the remote host is an open relay. For example, referring to step 1064 of FIG. 4, the spammer forged the MAIL From address "good@relay.dom". Thus, when the proxy receives "250" responses to both messages, the preferred embodiment of the Active Relay method is to reject the message and log its rejection. If a subsequent review of rejected messages shows a legitimate address, the administrator of an Active Filtering proxy can then add the individual address to the whitelist database (FIG. 7, item 1094) or can bypass relay testing for smtp.bigisp.dom by defining it as a non-relay in the Relay database 1096 (FIG. 7).

The remote host may also respond with a "550" (for example) to message 1458 and a "250" to message 1465. Some hosts will permit promiscuous relaying but reject any non-existent local addresses. In this case the proxy rejects the email message.

The remote host may respond with a "550" (for example) to both RCPT messages. In this case the remote host itself is probably not an open relay. The bad address is probably either forged by a user at the remote host or there exists a multi-hop relay path through some other host that is trusted by the remote host 1400.

The administrator may manually edit the relay database to add an IP address if a review of log entries shows that the remote host is an authorized "smart host", i.e., a host authorized to handle the local network's outgoing email. In addition, certain MTA programs give a "250" reply to the RCPT message 1465, but then discard the message later on. These may be configured as trusted or as non-relay.

The active relay method permits automatic rejection of all email sent from a user at an open relay host or relayed by an open relay host. However, in some cases it is necessary to override this behavior, for business or other reasons. For example, with respect to the bigisp example given above, the administrator of the Active Filtering proxy can configure the proxy to permit email sent from smallhost.dom and relayed by bigisp.dom by any one of the following actions: (1) defining bigisp.dom as a trusted domain, (2) defining smallhost.dom as a trusted domain, (3) adding a whitelist entry for the specific address "user@smallhost.dom", (4) or adding a non-relay entry for bigisp.dom, even though it is an open relay.

A pre-installation site survey can anticipate such problems by reviewing system logs and testing all hosts that have recently connected to the local organization for relaying. Any open relays can then be configured in the respective databases before the Active Filter proxy is installed. No special actions are required for hosts that do not relay or for hosts that do not routinely send mail to the local organization.

With reference again to FIG. 18, if the Active Relay method determines the remote host 1400 to be an open relay, it sends an error message 1468 to the remote host, appends the IP address of the open relay to the blacklist file, writes an entry to the system log, and exits without transferring the message to the local MTA. Otherwise, if the remote host is not an open relay, the proxy continues with message transfer at step 1470. It is noted that relay testing is more accurate than user testing, so that user testing may be skipped.

The preferred embodiment of the Active Relay method performs testing in the order shown in FIG. 18. In particular, this ordering avoids the relay test sequence if the remote host is configured as a non-relay (step 1462) or the domains match and loose relay testing is configured (steps 1463 and 1464). However, alternative embodiments may provide for other orders of testing.

Active User Testing

The Active User method illustrated in FIG. 19 determines if the MAIL From address 1413 is acceptable to a mailhost 1900 configured to receive email for the MAIL From domain. By convention, this mailhost is either a Mail Exchange (MX) host or the host identified in the MAIL From message. This method uses the same SMTP messages described for the Active Relay method (FIG. 18, steps 1454–1458), but in most cases the proxy accesses a different mailhost than the remote host 1400. While the Active Relay test is concerned with determining if the remote host 1400 is at risk for sending relayed or forged email, the Active User test accesses the mailhost 1900 responsible for receiving email for the MAIL From domain to determine if it will accept email for that address. If it does not accept the MAIL From address, then this indicates that the MAIL From address is probably forged and does not exist on that network.

For example, assume the remote domain remote.dom has two mail servers, out.remote.dom for sending outgoing email and mx.remote.dom for receiving incoming email. If the proxy 1401 receives a connection 1403 from out.remote.dom, the proxy will be unable to establish a reverse test connection 1418 to that particular host because it is not configured to accept incoming SMTP connections. Assuming that the host names surrounding out.remote.dom do not appear to be dialups, it remains for the Active User method to attempt to validate the MAIL From address. In this case the proxy 1401 would find the MX host mx.remote.dom and query that host as to the validity of the MAIL From address.

This Active User method is not completely accurate by itself, but does provide an additional level of testing when the proxy cannot query the remote host 1400 via the reverse test connection. Consequently, this method is used following Active Dialup testing (where there is no reverse test connection 1418) and after encountering errors in Active Relay testing.

The reason this method is not highly reliable by itself is that some large networks (AOL.COM, YAHOO.COM, MSN.COM) accept (that is, give a "250" response to) all RCPT messages identifying properly-formatted addresses on their respective networks. This is done both for performance reasons and to prevent outsiders from verifying or collecting addresses on that network by sending many different possible addresses and monitoring the responses. Still, enough networks do truthfully respond to RCPT messages to make the Active User method useful as a supplement to the Active Dialup and Active Relay methods.

With respect to FIG. 19, the Active Filtering proxy 1401 begins operation at step 1901 subsequent to either Active Dialup or Active Relay testing. In step 1902, the proxy identifies a mailhost 1900 responsible for receiving mail to the MAIL From address 1413. The proxy searches the Domain Name System (DNS) information for the MAIL From domain for records identifying Mail Exchange (MX) hosts for that domain. MX records include a host name and priority value, and by convention the lowest priority value identifies the MX host that should be tried first. In the preferred embodiment, the proxy uses resolver library routines such as the DNS BIND res_init( ) and res_querydomain( ) functions to access the MX records, however, other methods may be used to access the name server. If no MX host is found, then the proxy uses the MAIL From address (that is, the host name to the right of the "@" character in the MAIL From address) as the mailhost.

In step 1903, the proxy attempts to connect to the mail server identified in step 1902. This follows the same mechanisms described in step 1418, except that the TCP connection is to the identified mailhost 1900 rather than to the remote host 1400. If the connection is successful in step 1904, the proxy waits at step 1906 for the system greeting 1905 from the mailhost. Otherwise, if the connection is unsuccessful, the preferred embodiment of the proxy simply proceeds to step 1470 for message transfer to the MTA. In alternative embodiments, the proxy might successively check for lower-priority MX hosts if the highest priority host is not available.

It is noted that for some networks where the same host handles both incoming and outgoing email, the mailhost 1900 may be the same (that is, have the same IP address) as the remote host 1400. In this case, the proxy simply makes a second test connection to the same host without regard to having previously tested the MAIL From address at this host.

Steps 1905–1912 follow steps 1452–1459 in the Active Relay test in FIG. 18, respectively. After receiving the system greeting, the proxy issues a HELO message in step 1907. Subsequently, after receiving the HELO reply, it sends a MAIL From message in step 1909 with the reserved Active Filtering test address. And finally, it sends a RCPT message in step 1911 with the MAIL From address received in step 1414 (FIG. 15).

In step 1913 the proxy inspects the mailhost's reply to the RCPT message. If the reply is "250", the proxy continues with message reception at step 1470. If the domain mailhost 1900 gives any reply other than "250", then in step 1914 the proxy 1401 sends an error reply to the remote host 1400 on connection 1403, closes data connection 1403 and test connection 1903, logs the rejection, adds the IP address of the remote host 1400 to the blacklist database, and exits.

Preferably, when appending an IP address to the blacklist database 1095, the proxy adds a 4-byte IP address, e.g., 192.168.200.45, along with some number of bits to be matched. Typically the number of bits is 24, so that any subsequent connection by any host in the range 192.168.200.0 through 192.168.200.255 will be rejected by the blacklist mechanism. This takes into account that Class C addresses are normally assigned to organizations in multiples of 256, so subsequent connections in the 192.168.200.x range are normally owned by the same irresponsible organization, so it makes sense to block all of them. However, if the ownership is subsequently determined to be something more or less than a single class C, then the blacklist file can be manually edited to block one or more hosts.

Other than the trusted database, the preferred embodiment does not require any special databases to control the Active User test mechanism. In an alternative embodiment, a database prevents unnecessarily testing networks such as AOL.COM that automatically respond with a "250" to RCPT addresses.

Connect to MTA

All message rejections to this point have not involved any storage (other than log entries) being allocated on either the proxy or the MTA host computer. If all tests have been successful, then FIG. 20 shows how the proxy 1401 connects to the MTA and transfers the initial SMTP messages required to set up the transfer of the message to the MTA.

In step 1470 the proxy connects to the MTA using the same method described for the reverse test connection 1418. In summation, the proxy connects to the MTA for messages with any of the following characteristics: connection from a trusted domain (step 1417); trusted MAIL From domain (step 1417); whitelisted MAIL From address (step 1417); or email from a user with an account at a non-dialup, non-relay host (step 1467). In addition, subject to the validity of the user address as determined in step 1913, the proxy will permit mail from hosts where the reverse connection fails, but host is configured as non-dialup (step 1421); reverse connection fails, but host is not detected as a dialup (step 1424); reverse connection succeeds, but relay test is inconclusive (steps 1454, 1456, 1458); reverse connection succeeds, but host is configured as non-relay (step 1462) or reverse connection succeeds, MAIL From address matches connecting host, and the proxy is configured for loose relay testing (steps 1463, 1464).

At steps 1470–1475 of FIG. 20, the proxy 1401 connects to the local MTA 1402, sends the accumulated information received so far from the remote host, and starts to transfer data between the remote 1400 and the MTA 1402. The proxy opens the TCP connection 1470 and awaits a greeting 1471 from the MTA. When it receives the greeting, it sends the HELO message 1472 to the MTA that it received from the remote host 1400 in step 1430. If no HELO message was received from the remote host, then the proxy does not send the message 1472. The proxy then awaits the response 1473 from the MTA, and sends the MAIL From message 1474 that it received from the remote host 1400 in step 1433. The proxy 1401 then awaits the MTA's response 1475 from the MAIL From message, and writes that response immediately to the remote host 1400.

In steps 1480 and 1481, the proxy simply receives a RCPT message from the remote host 1400 and passes it transparently to the MTA 1402. In steps 1482 and 1483, it receives the SMTP reply from the MTA and passes it transparently to the remote host. The remote host may send multiple of these RCPT messages, each of which is handled in the same way.

In the preferred embodiment, the proxy permits the remote host to send multiple RCPT messages up to the number of maximum recipients permitted by the MTA 1402. If this occurs, the MTA will return an error message for each subsequent RCPT message, which will be passed transparently to the remote host. In an alternate embodiment, the proxy 1401 may keep track of the number of recipients and reject any RCPT messages that exceed the configured maximum.

Message Transfer and Bcc Filtering

At this point, the proxy 1401 is operating in a transparent pass-through mode. Prior to step 1475, the proxy operates at the application level, where it handles the SMTP messages on behalf of the local MTA. Beginning with step 1475, the proxy operates in a filtering mode where it simply transfers data between the remote host 1400 and the MTA 1402, with limited filtering.

FIG. 21 shows the processing steps involved in transferring the actual email message from the remote host 1400 to the MTA 1402. Except for the limited filtering performed in steps 1491 and 1492, the proxy transparently transfers the SMTP DATA command 1484, message header lines 1488, message body lines 1490, 1493, and closing protocol lines 1495 from the remote host 1400 to the MTA 1402. By convention, the message header is defined as all lines of the message down to, but not including, the first empty line. The proxy also transparently transfers SMTP replies from the MTA to the remote host (steps 1486 and 1497). As is consistent with SMTP, the lines of the message header and message body are not individually acknowledged by the MTA.

The proxy may integrate any conventional filtering method, such as one that prevents Blind Carbon Copy (Bcc) messages. Such mail is characterized with a local domain address in one of the RCPT To: messages 1480, but without a reference to the local domain in the header lines 1488 of the message. This can either be legitimate and intentional (as when a sender defines a Bcc address in their mail reader) but is generally abused by junk mailers in order to save the processing time required to reprocess the message header for each recipient.

In step 1491, the proxy 1401 checks To, Cc, and associated continuation lines for a local domain address. The filter permits Bcc messages only for trusted addresses. If it has not found a local To or Cc address when it reaches the last line of the message header, it writes an error message to the remote host, closes the data connection 1403, logs the event, appends the IP address of the remote host to the blacklist 1406, and exits, step 1492. This appears to the MTA 1402 as an interrupted TCP connection. The MTA typically logs this event to the system logfile, but does not send the partial message to any local users.

In steps 1495–1498, the proxy 1401 closes the connection 1403 from the remote host and the connection 1470 to the local MTA when it senses that either connection has been terminated. Typically, the remote host closes the connection by sending a "QUIT" message 1495 to the MTA 1402. The MTA then writes a status response 1497 and closes the connection 1470. The proxy 1401 senses the closed connection and closes the connection 1403 from the remote host 1400.

This ends the transfer of the single SMTP email message associated with the current instance of the proxy 1401, and the proxy 1401 exits. In the preferred embodiment, multiple messages from multiple remote hosts are handled by relying on the proxy server's operating system 1090 (FIG. 7) to run multiple instances of the proxy process, one for each message. However, other implementations are consistent with this invention such as, for example, a multi-threaded proxy server process that handles multiple messages.

The preferred embodiment has been described as having IP filter testing 1406, followed by Active Dialup testing 1420, Active Relay testing 1450 and Active User testing 1900. However, it should be appreciated that these tests may be implemented in various other orders. In addition, each of these tests have individual uses, and need not be used in connection with one or more of the other tests.

The foregoing descriptions and drawings should be considered as illustrative only of the principles of the invention. The invention may be configured in a variety of different manners and is not limited by the preferred embodiment. Numerous applications of the present invention will readily occur to those skilled in the art. For example, though the preferred embodiment of the invention is implemented on a global network, such as the Internet, it may also be used, for instance, in an isolated intranetwork or using closed networking protocols such as Novell Netware.

In addition, in the event that it becomes illegal to connect to any mail server except to transfer legitimate email, a message may be transferred to the MAIL From address saying "We have received your SMTP connection and are considering whether to accept your email message." The preferred embodiment tests for relaying only for non-trusted hosts who attempt to deliver mail to the local MTA.

While the preferred embodiment uses Internet standard protocols such as IPv4, DNS, TCP, and SMTP, the invention may also be used with other networking protocols and network architectures, such as, for instance, IP version 6 (IPv6) or X.500 name services, or protocols not yet developed. Further, the invention may be used with other backbone MTA-to-MTA protocols such as Extended SMTP (ESMTP), the X-400 Message Handling System (MHS) or client-to-mailhost protocols such as POP or IMAP when the Active Filtering functions are not performed on the backbone. Further yet, the invention may be used with various cryptographic architectures such as Secure Socket Layer (SSL), IP Security (IPSec), S/MIME or OpenPGP standards, although spammers are unlikely to use any protocols involving traceable encryption keys.

The Active Filtering methods described in this application can be integrated with other suitable devices and/or methods to provide additional capabilities. The proxy can also be configured with additional databases not described in this aplication to provide further controls or increased performance. For example, the preferred embodiment of the proxy does not provide for appending hosts determined to be non-relay or non-dialup to these respective databases. However, subject to performance requirements, other embodiments of this proxy might perform caching of tested addresses so as to avoid unnecessary re-testing.

Therefore, it is not desired to limit the invention to the specific examples disclosed or the exact construction and operation shown and described. Rather, all suitable modifications and equivalents may be resorted to, falling within the scope of the invention.

I claim:

1. A system for detecting and selectively preventing reception of an electronic message to a local message transfer agent (MTA), the electronic message having an address identifying a sender and transferred over a connection from a remote host, the system comprising:
   a dialup filter determining whether the connection is a dialup connection and, if the connection is a dialup connection, terminating the connection;
   a relay filter determining whether the remote host is an open relay and, if the remote host is an open relay, terminating the connection; and,
   a user filter verifying whether the sender of the electronic message is authorized and, if the sender of the electronic message is not authorized, terminating the connection;
   wherein, said system establishes communication over the connection between said remote host and the local MTA if said system determines that the connection is not a dialup connection, said relay filter determines that the remote host is not an open relay and said user filter verifies the sender as authorized.

2. The system of claim 1, wherein said system attempts to establish a reverse connection from said system to the remote host, wherein if the reverse connection cannot be established then said dialup filter determines whether the connection is a dialup connection, and if the reverse connection is established then said relay filter determines whether the remote host is an open relay.

3. The system of claim 2, wherein after said dialup filter determines whether the connection is a dialup connection or if the relay filter is unable to determine whether the remote host is an open relay, said user filter verifies whether the sender is authorized.

4. The system of claim 1, wherein said user filter verifies the sender in response to said relay filter not being able to determine whether the remote host is an open relay.

5. The system of claim 1, wherein said system is part of a firewall host.

6. The system of claim 1, wherein the electronic message is transferred in accordance with Simple Mail Transfer Protocol or Extended Simple Mail Transfer Protocol.

7. The system of claim 1, wherein said system validates the electronic message after a mail from transaction is received from the remote host.

8. The system of claim 1, further comprising a memory, wherein said system validates the electronic message after a data transaction is received, the memory storing intended recipients of the rejected electronic message.

9. The system of claim 1, wherein said system operates in a packet transfer mode once the connection is established with the local host.

10. The system of claim 1, wherein said system is integrated within a wrapper program.

11. The system of claim 1, further comprising an IP filter having a blacklist database, said IP filter terminating the connection if the remote host corresponds to a blacklisted host on the blacklist database.

12. The system of claim 11, wherein said dialup filter adds any remote host determined to be a dialup to the blacklist database.

13. The system of claim 11, wherein said relay filter adds any remote host determined to be an open relay to the blacklist database.

14. The system of claim 1, further comprising an electronic mail address filter having a whitelist database, wherein said system establishes a connection to the remote host if a mail from address of the sender is in the whitelist database.

15. The system of claim 1, further comprising a trusted host database, wherein said system establishes a connection between the remote host and the local MTA if a domain name or IP address for the remote host is stored in the trusted host database.

16. The system of claim 1, said dialup filter having a dialup database listing remote hosts that were predetermined as not having a dialup connection, said dialup filter determining that the connection is not a dialup connection if the remote host is configured as a non-dialup.

17. The system of claim 16, said dialup filter including the remote host in the dialup database as not having a dialup connection or in cache if said dialup filter determines that the remote host does not have a dialup connection.

18. The system of claim 1, said dialup filter determining whether the connection is a dialup connection if the system is unable to establish a reverse connection with the remote host and based upon a remote host name and a name for at least one host neighboring the remote host.

19. The system of claim 1, said dialup filter determining whether the connection is a dialup connection if the system is unable to establish a reverse connection with the remote host and at least one host neighboring the remote host.

20. The system of claim 1, said relay filter having a relay database listing remote hosts that are not open relays, said relay filter determining that the remote host is not an open relay if the remote host is listed in the relay database.

21. The system of claim 1, said relay filter establishing a test connection from said system to the remote host and initiating a transaction with the remote host, said relay filter determining that the remote host is an open relay based upon the remote host's response to the test transaction.

22. The system of claim 21, said relay filter including the remote host in the non-relay database or cache if the remote host is determined not to be an open relay.

23. The system of claim 21, wherein the test electronic message is addressed to the sender and said relay filter determines whether the remote host is an open relay based upon whether the remote host accepts the test electronic message.

24. The system of claim 21, wherein the test electronic message is addressed to an unrelated host that is unrelated to the remote host, and said relay filter determines whether the remote host is an open relay based upon whether the remote host accepts the test electronic message.

25. The system of claim 1, wherein the electronic message comprises an email.

26. The system of claim 1, wherein selectively preventing reception of the electronic message at the local MTA comprises terminating the connection by said dialup filter, relay filter or user filter.

27. The system of claim 1, wherein said system prevents reception of undesirable electronic messages by the local MTA.

28. The system of claim 1, wherein the system comprises a filter proxy.

29. An article of manufacture for detecting and selectively preventing reception of an electronic message by a local host having a local message transfer agent (MTA), the electronic message transferred over a connection from a remote host, the article of manufacture comprising a computer-readable medium having stored thereon instructions which, when performed by a processor, cause the processor to execute the steps comprising the steps of:

determining whether the connection is a dialup connection;

terminating the connection to the remote host in response to determining that the connection was established by a dialup connection; and, forwarding the electronic message to the local host in response to determining that the connection was not established by a dialup connection.

30. The article of manufacture of claim 29, further comprising attempting to establish a reverse connection to the remote host, wherein the step of determining whether the connection is a dialup connection is performed only if the reverse connection is not established, otherwise determining whether the remote host is an open relay, terminating the connection to the remote host in response to determining that the remote host is an open relay, and forwarding the electronic message to the local host in response to determining that the remote host is not an open relay.

31. The article of manufacture of claim 30, further comprising the steps of verifying, in response to determining that the remote host is not an open relay, whether a sender of the electronic message is authorized at a mailhost configured for the sender, terminating the connection to the remote host if the sender is not authorized at the remote host, and forwarding the electronic message to the local host if the sender is authorized.

32. The article of manufacture of claim 29, wherein the steps of determining, forwarding and terminating are performed at a system located outside the local host.

33. A proxy filter comprising an input port for receiving an electronic message on a connection from a remote host, a dialup filter determining whether the connection is a dialup connection and terminating the connection if the connection is determined to be a dialup connection, and an output port forwarding the electronic message received over the connection to a local host if the connection is determined to not be a dialup connection.

34. The proxy filter of claim 33, further comprising a an IP filter having a blacklist database, said IP filter terminating the connection if the remote host corresponds to a blacklisted host on the blacklist database.

35. The proxy filter of claim 34, wherein said dialup filter adds any remote host determined to be a dialup to the blacklist database.

36. The proxy filter of claim 33, further comprising a trusted host database, wherein said proxy filter forwards the electronic message to the local host if a domain name or IP address for the remote host is stored in the trusted host database.

37. The proxy filter of claim 33, the dialup filter having a dialup database listing host names and addresses that are predetermined to not be a dialup, said dialup filter determining that the connection is not a dialup connection if the remote host is listed in said dialup database.

38. The proxy filter of claim 33, said dialup filter including the remote host in the dialup database or cache if said dialup filter determines that the remote host does not have a dialup connection.

39. The proxy filter of claim 33, said dialup filter determining that the connection is a dialup connection if the proxy filter is unable to establish a reverse connection with the remote host.

40. The proxy filter of claim 39, said dialup filter determining whether the connection is a dialup connection based upon a remote host name and a name for at least one host neighboring the remote host.

41. The proxy filter of claim 33, said dialup filter determining whether the connection is a dialup connection based upon a remote host name and a name for at least one host neighboring the remote host.

42. The proxy filter of claim 33, said dialup filter determining whether the connection is a dialup connection if the proxy filter is unable to establish a reverse connection with the remote host and with at least one host neighboring the remote host.

43. The proxy filter of claim 33, further comprising a user filter determining whether the sender of the incoming message is recognized by a mailhost that is configured for a sender's domain if the dialup filter determines the connection is not a dialup connection and said output port only forwards the electronic message received on the connection to the local host if the electronic message is authorized by the local host.

44. The proxy filter of claim 33, further comprising a relay filter determining whether the remote host permits relaying of electronic messages and terminating the connection if the remote host permits relaying of electronic messages, and the output port forwards the electronic message received over the connection to a local host if the remote host does not permit relaying of electronic messages.

45. The proxy filter of claim 44, wherein said proxy filter attempts to establish a reverse connection with the remote host, said dialup filter only determines whether the connection is a dialup connection if the reverse connection is not established and said relay filter only determines whether the remote host permits relaying if the reverse connection is established.

46. A proxy filter comprising an input port for receiving an electronic message over a connection from a remote host, a relay filter determining whether the remote host permits relaying of electronic messages and terminating the connection if the remote host permits relaying of electronic messages, and an output port forwarding the electronic message received over the connection to a local host if the remote host does not permit relaying of electronic messages.

47. The proxy filter of claim 46, further comprising a user filter determining whether the sender of the incoming message is recognized by a mailhost that is configured for a sender's domain if the relay filter determines the connection does not permit relaying of electronic messages and said output port only forwards the electronic message received on the connection to the local host if the electronic message is authorized by the local host.

48. The proxy filter of claim 46, said relay filter having a relay database listing remote hosts that are not open relays, said relay filter determining that the remote host is not an open relay if the remote host is listed in the relay database.

49. The proxy filter of claim 46, said relay filter establishing a reverse connection from said proxy filter to the remote host and initiating a test transaction to the sender at the remote host, the test transaction being addressed to the sender of the electronic message and said relay filter determining that the remote host is an open relay if the remote host accepts the test transaction.

50. The proxy filter of claim 46, said relay filter establishing a reverse connection from said proxy filter to the remote host and initiating a test transaction to the remote host from an unrelated domain, the test transaction being addressed to an unrelated host that is unrelated to the remote host, and said relay filter determining that the remote host is an open relay if the remote host accepts the test transaction.

51. The proxy filter of claim 46, wherein the relay filter dynamically determines whether the remote host permits relaying of electronic messages.

52. A proxy filter comprising an input port for receiving an electronic message on a connection from a remote host, the electronic message having an address identifying a sender, a user filter determining whether the sender of the incoming message is recognized by a mailhost that is configured for the sender's address and an output port for forwarding the electronic message received on the connection to the local host if the electronic message is authorized by the local host.

53. The proxy filter of claim 52, wherein the configured mailhost locates a highest-priority mail exchange record, and if no highest-priority mail exchange record exists, then locates a domain in the electronic message.

54. The proxy filter of claim 52, wherein the user filter dynamically determines whether the sender of the incoming message is recognized by a mailhost that is configured for the sender's address.

55. An article of manufacture for detecting and selectively preventing reception of an electronic message by a local host having a local message transfer agent (MTA), the electronic message transferred over a connection from a remote host, the article of manufacture comprising a computer-readable medium having stored thereon instructions which, when performed by a processor, cause the processor to execute the steps comprising the steps of:

determining whether the remote host is an open relay;

terminating the connection to the remote host in response to determining that the remote host is an open relay; and, forwarding the electronic message to the local host in response to determining that the remote host is not an open relay.

56. The article of manufacture of claim 55, further comprising establishing a reverse connection to the remote host, wherein the step of determining whether the remote host is an open relay is performed only if the reverse connection is established, otherwise determining whether the connection is a dialup connection, terminating the connection to the remote host in response to determining that the connection is a dialup connection, and forwarding the electronic message to the local host in response to determining that the connection is not a dialup connection.

57. The article of manufacture of claim 55, further comprising verifying, in response to determining that the connection is not a dialup connection, whether a sender of the electronic message is authorized at the remote host, terminating the connection to the remote host if the sender is not authorized at the remote host, and forwarding the electronic message to the local host if the sender is authorized.

58. The article of manufacture of claim 55, wherein the steps of determining, forwarding and terminating are performed at a filter proxy located outside the local host.

59. The article of manufacture of claim 55, wherein the step of determining whether the remote host is an open relay is dynamic.

60. A method for detecting and selectively preventing reception of an electronic message transferred over a connection from a remote host by a local host having a local message transfer agent (MTA), the method comprising:

determining whether the connection was established by a dialup connection;

terminating the connection to the remote host in response to determining that the connection was established by a dialup connection; and, forwarding the electronic message to the local host in response to determining that the connection was not established by a dialup connection.

61. The method of claim 60, further comprising establishing a reverse connection to the remote host, wherein the step of determining whether the connection is a dialup connection is performed only if the reverse connection is not established, otherwise determining whether the remote host is an open relay, terminating the connection to the remote host in response to determining that the remote host is an open relay, and forwarding the electronic message to the local host in response to determining that the remote host is not an open relay.

62. The method of claim 60, further comprising verifying, in response to being unable to determine whether the remote host is an open relay, whether a sender of the electronic message is authorized at the remote host, terminating the connection to the remote host if the sender is not authorized at the remote host, and forwarding the electronic message to the local host if the sender is authorized.

63. The method of claim 60, wherein the steps of determining, forwarding and terminating are performed at a filter proxy located outside the local host.

64. A method for detecting and selectively preventing reception of an electronic message transferred over a connection from a remote host by a local host having a local message transfer agent (MTA), the method comprising:

determining whether the remote host is an open relay;

terminating the connection to the remote host in response to determining that the remote host is an open relay; and, forwarding the electronic message to the local host in response to determining that the remote host is not an open relay.

65. The method of claim 64, further comprising establishing a reverse connection to the remote host, wherein the step of determining whether the remote host is an open relay is performed only if the reverse connection is established, otherwise determining whether the connection is a dialup connection, terminating the connection to the remote host in response to determining that the connection is a dialup connection, and forwarding the electronic message to the local host in response to determining that the connection is not a dialup connection.

66. The method of claim 64, further comprising verifying, in response to determining that the connection is not a dialup connection, whether a sender of the electronic message is authorized at the remote host, terminating the connection to the remote host if the sender is not authorized at the remote host, and forwarding the electronic message to the local host if the sender is authorized.

67. The method of claim 64, wherein the steps of determining, forwarding and terminating are performed at a filter proxy located outside the local host.

68. The method of claim 64, wherein the determining whether the remote host is an open relay is dynamic.

\* \* \* \* \*